United States Patent [19]

Katayama et al.

[11] Patent Number: 6,097,877

[45] Date of Patent: Aug. 1, 2000

[54] DIGITAL RECORDING AND REPRODUCING APPARATUS WHICH MULTIPLEXES AND RECORDS HDTV, SDTV AND TRICK PLAY DATA TOGETHER ON A MAGNETIC TAPE

[75] Inventors: Hironobu Katayama, Noda; Hiroaki Nogami, Matsudo; Kenichi Shiraishi, Noda, all of Japan

[73] Assignee: Sharp Kabushiki Kaisha, Osaka, Japan

[21] Appl. No.: 08/444,731

[22] Filed: May 19, 1995

[30] Foreign Application Priority Data

May 20, 1994 [JP] Japan ................................ 6-107056

[51] Int. Cl.[7] .......................... H04N 5/91; H04N 5/917; H04N 7/26

[52] U.S. Cl. ............................... 386/68; 386/81; 386/111

[58] Field of Search ................................... 358/335, 342, 358/310, 312; 360/10.1, 33.1; 386/6–8, 33, 68, 111, 112, 109, 108, 131

[56] References Cited

U.S. PATENT DOCUMENTS

| | | | |
|---|---|---|---|
| 4,974,064 | 11/1990 | Tsinberg | 348/489 |
| 5,073,821 | 12/1991 | Tatsuro, Jr. . | |
| 5,136,437 | 8/1992 | Tabuchi et al. | 360/64 |
| 5,168,356 | 12/1992 | Acampora et al. | 358/133 |
| 5,173,773 | 12/1992 | Ueda et al. | 358/136 |
| 5,253,058 | 10/1993 | Gharavi | 358/136 |
| 5,282,049 | 1/1994 | Hatakenaka et al. . | |
| 5,317,413 | 5/1994 | Yanagihara . | |
| 5,377,051 | 12/1994 | Lane et al. | 360/33.1 |
| 5,414,469 | 5/1995 | Gonzales et al. | 348/408 |
| 5,418,571 | 5/1995 | Ghanbari | 348/416 |
| 5,450,209 | 9/1995 | Niimura et al. | 358/335 |
| 5,465,158 | 11/1995 | Morioka et al. | 358/310 |
| 5,465,180 | 11/1995 | Amarla et al. | 360/19.1 |
| 5,477,397 | 12/1995 | Naimpally et al. | 386/123 |
| 5,485,279 | 1/1996 | Yonemitsu et al. | 348/411 |
| 5,486,931 | 1/1996 | Kim et al. | 358/335 |
| 5,502,493 | 3/1996 | Meyer | 348/426 |
| 5,510,787 | 4/1996 | Koster | 341/76 |
| 5,576,902 | 11/1996 | Lane et al. | 386/68 |
| 5,627,935 | 5/1997 | Kim | 386/81 |
| 5,647,048 | 7/1997 | Ting et al. | 386/68 |
| 5,717,816 | 2/1998 | Boyce et al. | 386/111 |

FOREIGN PATENT DOCUMENTS

| | | |
|---|---|---|
| 0 202009 | 11/1986 | European Pat. Off. . |
| 0 353758 | 2/1990 | European Pat. Off. . |
| 0 367264 | 5/1990 | European Pat. Off. . |
| 0 562845 | 9/1993 | European Pat. Off. . |
| 5-81838 | 4/1993 | Japan . |
| 5-244578 | 9/1993 | Japan . |
| 6-141073 | 5/1994 | Japan . |

OTHER PUBLICATIONS

Chatel, Jean "Compatible Hierarchy of Studio Standards", *SMMPTE Journal*, vol. 99 (199) ) Oct. No. 10, White Plains, NY, US.

"A Study on Digital VCR System for ATV in the U.S.A.", Technical Report of the Institute of Television Engineers of Japan, VR93–55, vol. 17, No. 59, pp. 7–13.

"A Study of High Speed Search Tecnique for Digital VCR with High Bit Rate Reduction System", Technical Report of the Institute of Electronics, Information and Communication Engineers of Japan, MR93–28 (1993–10).

ISO?IEC 13818–2 MPEG H.262, PP:1–28 (numbered by examiner), May 10, 1994.

David A. Huffman, A Method For The Construction of Minimum–Redundancy Codes, IEEE, p.1098–1101, Sep. 1951.

Frank Lane et al., "Fast Scan Technology For Digital Video Tape Recorders", IEEE, p. 186–191, Aug. 1993.

*Primary Examiner*—Douglas W. Olms
*Assistant Examiner*—David R Vincent

[57] ABSTRACT

A digitally recording and reproducing apparatus simultaneously records two kinds of digital signals of an identical video program, generated by high-efficiency coding, or a relatively high bit-rate signal and a relatively low bit-rate signal, onto the approximately the same positions on the tape. The apparatus is constructed so that the low bit-rate signal is commonly used for normal playback and search-playback. Further, the recording time can be lengthened by reducing the recording bit-rate.

9 Claims, 16 Drawing Sheets

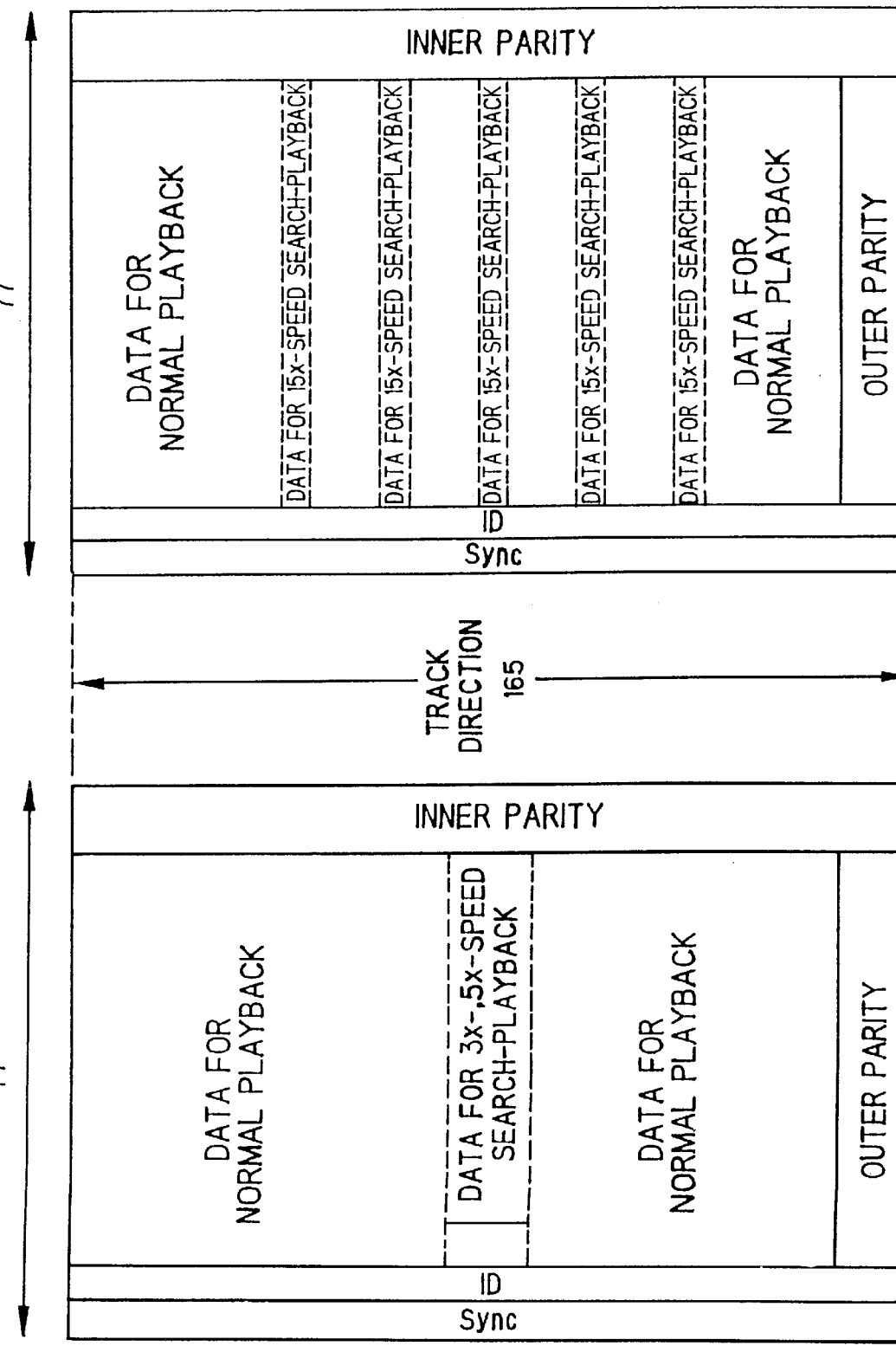

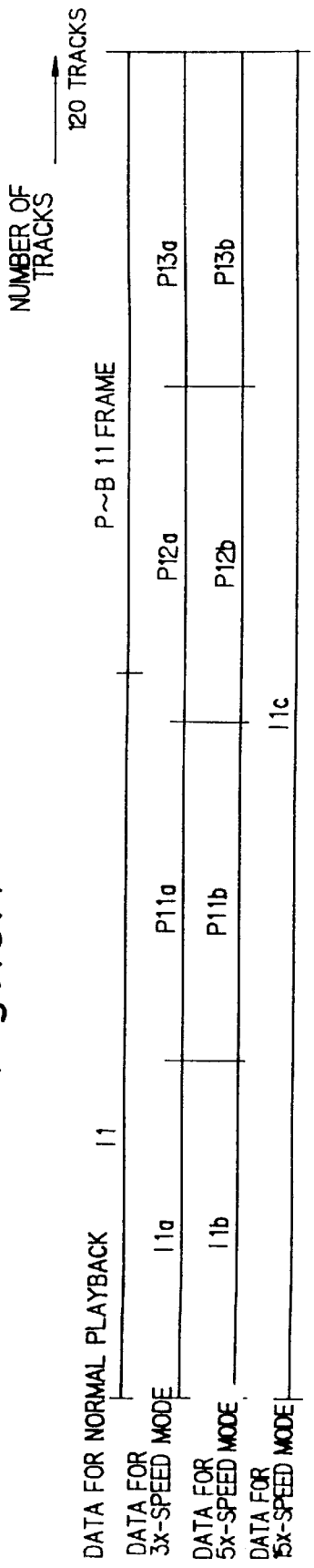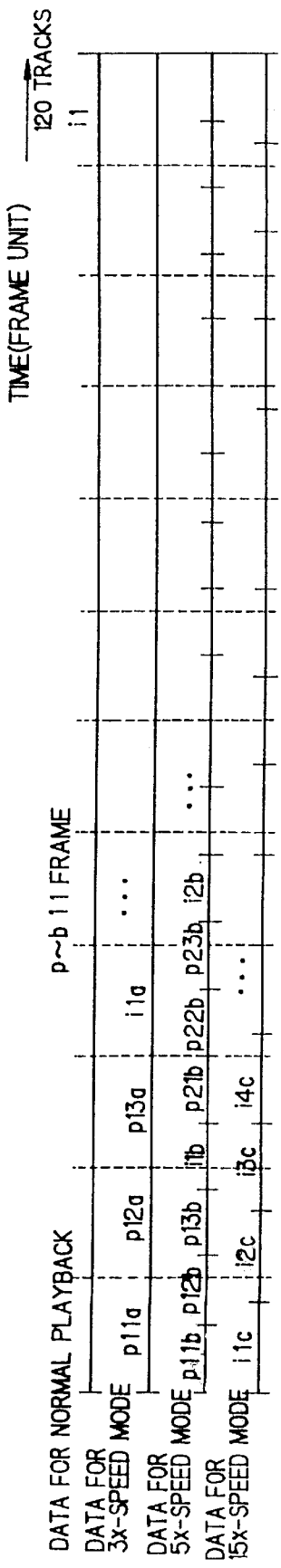

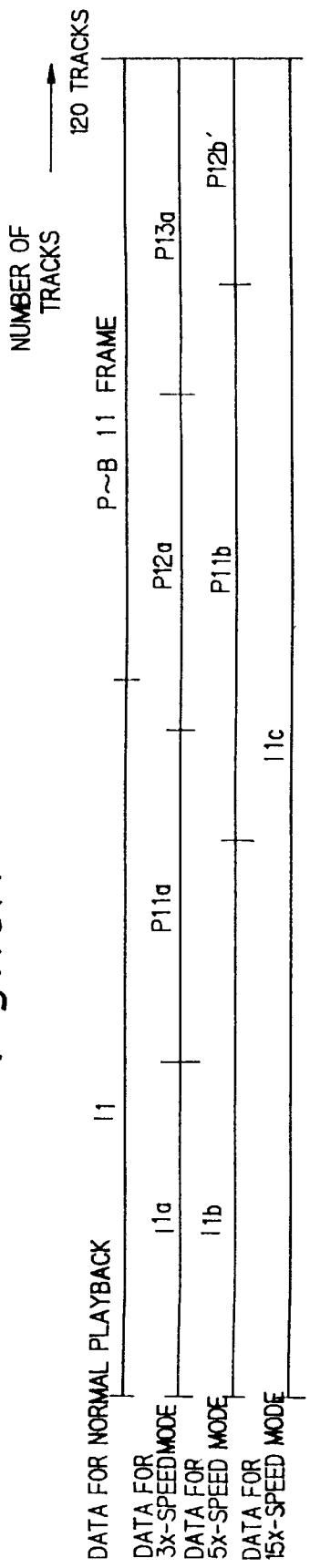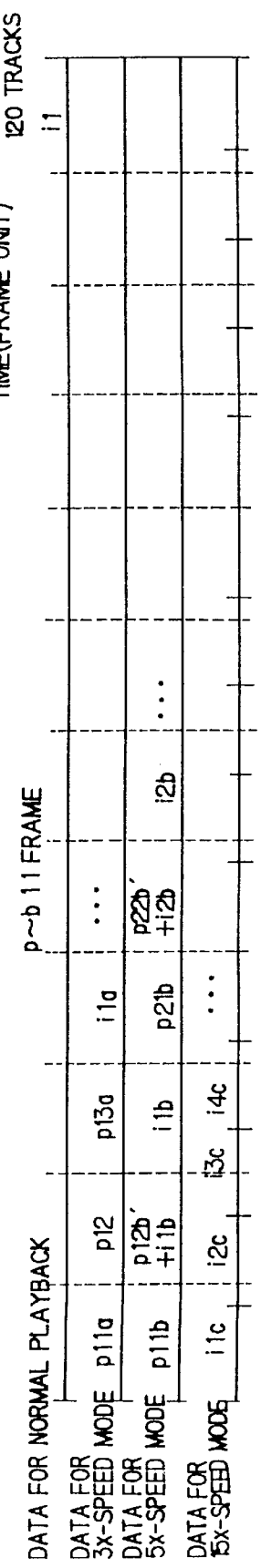

DIGITAL RECORDING AND REPRODUCING APPARATUS WHICH MULTIPLEXES AND RECORDS HDTV, SDTV AND TRICK PLAY DATA TOGETHER ON A MAGNETIC TAPE

BACKGROUND OF THE INVENTION (1) Field of the Invention

The present invention relates to a digital recording and reproducing apparatus in which relatively long recording as well as a multiple number of search playback modes having different search speeds can be realized by compressing band width of the recording signal.

(2) Description of the Prior Art

In order to make an international agreement of standard specifications of a digital VTR for home-use that is expected as the one for a next generation, the HD-DIGITAL VCR CONFERENCE has been set up and an agreement was reached internationally as to between the recording schemes of current television system (to be abbreviated, hereinafter, as SDTV (Standard Definition)) and that of the HDTV system in April, 1994. The specifications thus agreed are characterized that both the television signals for the SDTV and the HDTV can be recorded using a common configuration. This method mainly effects high-efficiency coding inside frame. Specifically, the technique mainly performs the discreet cosine transform (to be referred to, hereinafter, as DCT) and the variable-length coding. One of reasons the inside-frame high-efficiency coding technique was adopted is that there is a need for high-speed searching reproduction which makes it easy to effect editing operations. That is, the system should reproduce high-quality pictures without unnaturality when pictures are reproduced in a search mode of at least ten times or less speed.

FIG. 1 is a block diagram briefly showing the above-stated home-use DVCR which has been internationally consented (those of SD.VCR specifications will hereinafter be referred to as a SD-VCR). An inputted image signal is A/D converted into the luminance signal Y and two kinds of chrominance signals $C_N$ and $C_W$ and then divided into blocks of 8×8 pixels. Thereafter, the data is shuffled for every block in a block shuffling section 101. This is done both to disperse frequency components so as to improve the efficiency of the following high-efficiency coding mainly consisting of the DCT and to disperse burst errors to be caused by dropout at the playback mode. A high-efficiency coding section 102 effects an orthogonal transform using the DCT technique so that the signals are represented by coefficients with respect to frequency components. The section 102 further effects the quantization of the coefficients adaptively as well as the variable-length coding to remove the redundancy or consecutive 0's. Sufficient removal of redundancy in the high-efficiency coding section 102 markedly reduces the bit rate of the signal. In an error correction coding section 103, the thus high-efficiency coded, compressed signal is added with a necessary parity code for correcting code errors which would be generated at the playback mode. In a Sync and ID adding section 104, a synchronizing code for effecting PCM synchronization and an ID code for discriminating the block content are added to each of sync blocks containing the synchronizing code. A modulating section 105 represents a modulator for efficiently recording the recording signal. The 24-25 modulating method is adopted in the modulator used in the configuration of the DVCR specifications for the purpose of reducing the d.c. component. The output from the modulation is amplified through a recording amplifier and recorded on a magnetic recording medium via a video head.

At the playback mode, the recorded signal is picked up via the video head, and the thus regenerated signal is amplified through a regenerating amplifier and supplied to a demodulating section 107, to thereby recover digital information. Then, the operation is effected in just the reverse direction or in the opposed direction to that effected in the recording mode. That is, a sync and ID detecting section 108 detects the synchronizing code for PCM as well as decodes and deciphers the content of the ID code. An error correcting and decoding section 109 detects code errors and completely corrects the errors if any. A decoding and modifying section 110 subjects the compressed video information by the high-efficiency coding section to the variable-length decoding and the inverse quantization and effects IDCT for the thus processed video information to recover a video signal approximately corresponding to the original video signal. If there is an erroneous code which is unrecoverable, the section 110 effects interpolation using data before and after the code in question. The thus recovered output is still not the complete video signal, but should be deshuffled by every block in the following deshuffling section 111, to thereby reproduce the original video signal.

FIG. 2 shows a structure and a recording format of sync blocks in the DVCR stated above. Each sync block is composed of 90 bytes containing two bytes for a synchronizing code, three bytes for an ID code and 77 bytes for video data with eight bytes of inner parity of the Reed-Solomon correcting code. Assigned for video data in the format are 135 sync blocks (to be abbreviated SB, hereinbelow) each having 77 bytes.

At present, no specific scheme is established for recording the signal which is formed by compressing image data on the basis of the high-efficiency coding scheme standardized as MPEG-2 by the MPEG (Moving Picture Image Coding Expert Group) using the tape driver, signal processor and recording and reproducing system in the aforementioned DVCR. The MPEG-2 coding scheme was first defined in the MPEG-2 System Committee Draft (ISO/IEC JTC1/SC29/WG11/N0601, November, 1993) and then discussed at the Grand Alliance Conference of Apr. 14, 1994. The MPEG-2 standard was approved Nov. 11, 1994 by the International Organization of Standards (ISO), and is now formally referred to as ISO 13818. FIG. 3 shows a structure of coding proposed as a provisional standard for the ATV. In the figure, a symbol I represents a coding process within a frame, P represents a predictive coding process relative to a forward frame as an interframe coding process and B represents another predictive coding process relative to both the forward and backward frames. In the case where the video signal thus formulated based on the above interframe predicative coding is recorded as it is on the basis of the SD specifications already consented, the signal is regenerated from several different tracks as disconnected data as shown in FIGS. 4A and 4B when the system is operated in the picture search playback mode. Accordingly, it is barely possible to reproduce a complete picture with clear content.

In a case where the MPEG signal processing scheme is adopted as in the ATV, noting the fact that intraframe processed I-pictures repeatedly appear every twelfth frame, a technique in which special data prepared for the special playback is recorded in specially allotted recording areas has been disclosed in a Technical Report vol.17 No.59 of The Institute of Television Engineers of Japan and in a Technical Report MR93-28(1993-10) of The Institute of Electronics, Information and Commutation Engineers. This method however requires a considerable amount of data for reproducing I-pictures for the ATV as will be shown hereinbelow.

Consider a case where I-pictures are recorded with a reduced quality of image equivalent to that of the NTSC or less, for example, where only DCT coefficients for d.c. components which exist one for each DCT block of 8×8 pixels are used. In this case, suppose that the number of valid samples is 1,920; the number of valid scan lines is 1,080 therefore the blocks amounts to 32,400. When only the d.c. components which exist one for every 64 components of each DCT are transformed into 8-bit data, the amount of data to be recorded totals to 32,400 bytes. In addition, if four bits are allotted for each of the remaining coefficients for a.c. components, another data of 1,020,600 bytes is required since each DCT block has 63 a.c. components. In other words, use of the a.c. coefficients bulks required data amount up to about 32 times. On the other hand, actually available data amount in the search playback mode depends on the recording system and the type of the recorded signal used. As an example of the ATV, if transmitting packets are transmitted at a rate of 19.3 Mbps and the rotating rate of the head is set up to be 150 rps, each track needs to have a data recording area of 105 SBs in order to completely record the transmitting packets. Accordingly, 30 SBs can be allotted as the data recording area for data in the search playback mode and therefore the total allowable data-recording area for the I-pictures of the ATV signal periodically appearing every twelfth frame amounts to 3600 SBs. Recording only the d.c. components of the I-picture requires 421 SBs, which corresponds to about one-eighth of the allowable data-recording area while recording of eight a.c. coefficients for every DCT block requires further 3366 SBs.

If data-recording areas able to be commonly used for the two kinds of head arrangements are to be considered as will be described later with reference to FIG. 14, sixty data-recording areas each consisting of 60 SBs are required within a period of twelve frames for the triple(3×)-speed search-playback mode. Of these, forty areas can be effectively used in the aforementioned search-playback mode and this corresponds to 2,400 SBs or 184,800 bytes. In this case, the allowable number of a.c. components for each DCT block is 4.7. This is the result when all the areas are allotted to 3×-speed search-playback mode. In practice, data-recording areas should be allotted for quintuple(5×)-speed mode, fifteen-times(15×)-speed mode etc., so that effective data amount allowable for each of the search modes decreases considerably. For example, suppose that 1,740 SBs can be taken as allowable recording areas for 3×-speed search mode, the available recording-areas amount to 1,160 SBs or 89,320 bytes. Further details will be discussed later.

Particularly, in realizing a high-speed search mode, (for example, 15×-speed search mode), to obtain ten effective recording areas within 30 tracks requires 96 established recording areas. This will be described later with reference to FIG. 12.

The following items are problems to be solved as to the recording apparatus described heretofore:

(1) As future broadcasting, both the ATV broadcasting for high-quality images and the SDTV (NTSC, PAL or SECAM) broadcasting are planned to be delivered in parallel through ground broadcasting, satellite broadcasting and CATV. However, there is no apparatus which is able to record both the high-bit rate signal and the low-bit rate signal, therefore, two types of recording apparatuses are required for recording respective signals.

(2) Since the conventional apparatus has no means for recording the low-bit-rate signal simultaneously with the high-bit-rate signal so that the low-bit-rate signal can be used for the normal playback and the special playback, it is necessary to display special-play images using a high-priced, high-resolution, wide display even if quality of pictures reproducible in the search mode is lower than that of the SDTV.

(3) Since, in the special-playback method already proposed as to the MPEG recording and as to the ATV recording, only the I-pictures are to be recorded and used for the special playback operation, it is impossible to reproduce smoothly animated images.

(4) There is a report of a method whereby intraframes and interframes are separately recorded. Since the data amount of an intraframe is, in general, ten times greater than that of an interframe, this makes it very difficult to establish recording areas for special play. There is another proposal that interframes are converted into intraframes for special playback, but this method still increases the amount of data required for special play.

(5) If the frame cycle of the recorded signal is not related with the multiple number of recording areas, it becomes difficult to meet recording positions of the normal playback data with recording positions of the special playback data. This makes it difficult to make sure the content of data on the tape in the search-playback mode and makes the signal processing circuit complicated.

(6) Mere allocation of recording areas for special playback bulks the amount of data to be recorded if there is necessity to ensure both forward and reverse searching operations.

(7) As to the head arrangement, in order to establish the interchangeability between the use of the double head and the use of the single head, greater recording areas is necessary.

(8) Since in the search-playback at a high speed, the periodic cycle of retracing with the head becomes long, it is impossible to actively follow the change of the search-playback speed. In order for the system to realize the active follow, duplicated data must be recorded in different places. This requires greater areas for data recording.

SUMMARY OF THE INVENTION

The present invention has been achieved in view of the above problems, and it is therefore an object of the present invention to provide a digitally recording and reproducing apparatus which is able to reproduce high-quality images in the search-playback mode even if both the intraframes and the interframes are encoded based on the high-efficiency coding scheme.

The present invention has been achieved to attain the above object and the gist of the present invention are as follows:

In accordance with a first feature of the present invention, a digitally recording and reproducing apparatus for recording and reproducing images which are band-compressed by high-efficiency coding is characterized in that a digital signal having both intraframe information and interframe information is processed to record and reproduce images, both relatively high-bit-rate and relatively low-bit-rate signals are simultaneously recorded into approximately the same positions, and whole or part of the relatively low-bit-rate signal is used to effect special playback which is indispensable a function as a video recording apparatus, whereby smoothly animated high-quality images are reproduced in a special reproduction mode.

In accordance with a second feature of the present invention, a digitally recording and reproducing apparatus is characterized in that in order to record both relatively high-bit-rate and relatively low-bit-rate digital signals as well as information associated with special playback modes into approximately the same positions, recording areas for the special playback information are set up so that the relation between an appearing cycle of the recording areas and a cycle of a series of digital signal frames for normal playback after recording becomes a simple integer ratio, and the information used for special playback operations is divided properly and recorded into the recording areas.

In accordance with a third feature of the present invention, a digitally recording and reproducing apparatus is characterized in that in order to record both relatively high-bit-rate and relatively low-bit-rate digital signals as well as information associated with special playback modes into approximately the same positions, means are provided for setting up recording areas for the special playback information on recording tracks so that the relation between an appearing cycle of the recording areas and a cycle of a series of digital signal frames for normal playback after recording becomes a simple integer ratio, and a unit of the recording tracks is determined by the l.c.m. of some or several search speeds or the multiple of the l.c.m. (least common multiple).

In accordance with a fourth feature of the present invention, a digitally recording and reproducing apparatus is characterized in that, as to special playback information for relatively low-speed modes, putting main recording areas for different special playback modes together in the relatively middle portion on each recording track, allows information on the special playback operations to be shared by some modes as well as allows information on forward and reverse special playback operations to be markedly reduced, whereby the recording areas required for special playback operations can be reduced to a great extent.

In accordance with a fifth feature of the present invention, a digitally recording and reproducing apparatus is characterized in that, as to recording areas required for special playback operations for relatively low-speed modes, low-bit-rate signal available for normal playback is recorded together with intraframes and interframes into the recording areas in a layered manner.

In accordance with a sixth feature of the present invention, a digitally recording and reproducing apparatus is characterized in that in order to allow either a drum head with a double-chip head or with single-chip heads to be used interchangeably, duplicated information identical with one of the recorded information by the double-chip head is recorded on recording areas allotted to the drum with single-chip heads for recording special playback information, so that the recording medium can interchangeably be used in either of the head arrangements.

In accordance with a seventh feature of the present invention, a digitally recording and reproducing apparatus comprises means for generating digital signals of high-bit-rate and low-bit-rate and the means comprises: header discriminating means for discriminating headers attached to each of the signals, in order to deal with simultaneous broadcasting of the two television signals (as already proposed in the CATV and the like); means for generating the both signals required for normal playback; and means for generating a recording information for special playback from the low-bit-rate signal.

In accordance with an eighth feature of the present invention, a digitally recording and reproducing apparatus is characterized in that to deal with a case where a relatively high-bit-rate signal is inputted solely, the apparatus comprises a general-purpose, simple encoder such as MPEG-1 or MPEG-2 for generating a low-bit-rate signal having a considerably lower bit-rate than the relatively high-bit rate.

In accordance with a ninth feature of the present invention, a digitally recording and reproducing apparatus for recording and reproducing high-quality image signal composed of relatively many effective pixels and effective scan lines is characterized in that the apparatus comprises an image display device composed of relatively few effective pixels and effective scan lines so that images created from the low-bit-rate signal may be displayed.

In accordance with a tenth feature of the present invention, a digitally recording and reproducing apparatus is characterized in that the apparatus comprises an encoder which transforms a low-bit-rate signal into the double-scan scheme signal, to thereby allow image to be displayed on a display device having a high-quality large screen.

As stated heretofore, the digitally recording and reproducing apparatus of the present invention is thus constructed. The digitally recording and reproducing apparatus of the present invention, comprises; means which make it possible to record both high-bit-rate and low-bit-rate signals for an identical broadcasting program; means for utilizing in a layered manner the low-bit-rate signal, inclusive of intraframes and interframes, to effect special playback in accordance with the search-speed; and means for recording the three kinds of digital signals formed as above into approximately the same positions in association with the frame cycle of the recorded high-bit-rate signal. In order to make editing work easy, the apparatus further includes means for making the integer-multiples of the recording area for the search-playback modes correspond to the frame cycle for the high-bit-rate signal and setting up the recording areas in such a manner that the l.c.m. of the some search-speeds to be set up or the integer-multiple of the l.c.m. is set to be a unit of periodic recording areas. Adoption of the present invention makes it possible to record three kinds of signals for different purposes in approximately the same positions on the tape. Therefore it becomes possible to effect fine editing work.

To realize the search-playback operation requires forward and reverse search-playback modes. Further, it is necessary to establish the interchangeability as to the video-head arrangement in various kinds of head drums. In the present invention, to deal with the problems, the recording areas to be kept for effecting the search-playback operation from the low-bit-rate signal are collected in approximate center of the tape, so that the data groups available for different search-speed modes are allotted in a layered manner from the order of the low-speed search data. Further, areas of recording P-picture for effecting forward-predictive coding process between frames are assured in the recording areas for the low-speed search data, whereby smoothly animated images can be reproduced. All the effective data for the search-playback in the lowest speed mode is formed to be utilized to effect normal reproduction, so that the amount of data used for only search-playback is minimized, to thereby make the best of the various interchangeable functions.

In the application of the present invention, an ATV signal of 19.3 Mbps, for example, is used to form a low-bit-rate signal of 5 Mbps or less having the identical TV program content. Further, almost all data (inclusive of data on P- and B-pictures) from the low-bit-rate signal is also used for search-playback. That is, the system of the present invention is able to deal with the future ATV broadcasting concurrent with low-bit-rate signal. More specifically, the low-bit-rate signal simultaneously broadcasted is recorded and this can also be used for reproducing smoothly animated images in the search-playback mode. In addition, the search-playback images can be displayed on a simple, low-priced SDTV compact display additionally built in, for example, the recording and reproducing apparatus. Further, the present invention allows terminal displays for multimedia network to display without making any modification of the signal scheme. Moreover, if a simple, double-scan scheme transformer is added, the search-playback images can be displayed on a wide-frame, high-quality ATV display, as required.

BRIEF DESCRIPTION OF THE DRAWINGS

FIG. 10A is a diagram showing a data structure in the track direction wherein data on 3x-speed and 5x-speed search-playback operations is contained;

FIG. 10B is a diagram showing a data structure in the track direction wherein data on 15x-speed search-playback operation is contained;

FIG. 15A is a diagram showing positional relations of normal playback data and search data on tracks within a single GOP period in accordance with the present invention;

FIG. 15B is a chart showing relations of displaying frames of normal playback data and search data within a single GOP period;

FIG. 16A is a diagram showing positional relations of recorded data on tracks within a single GOP period in another means than that in FIG. 15A; and FIG. 16B is a diagram showing timing relations of displaying frames within a single GOP period in another means than that in FIG. 15B.

DESCRIPTION OF THE PREFERRED EMBODIMENTS

Figure 1:
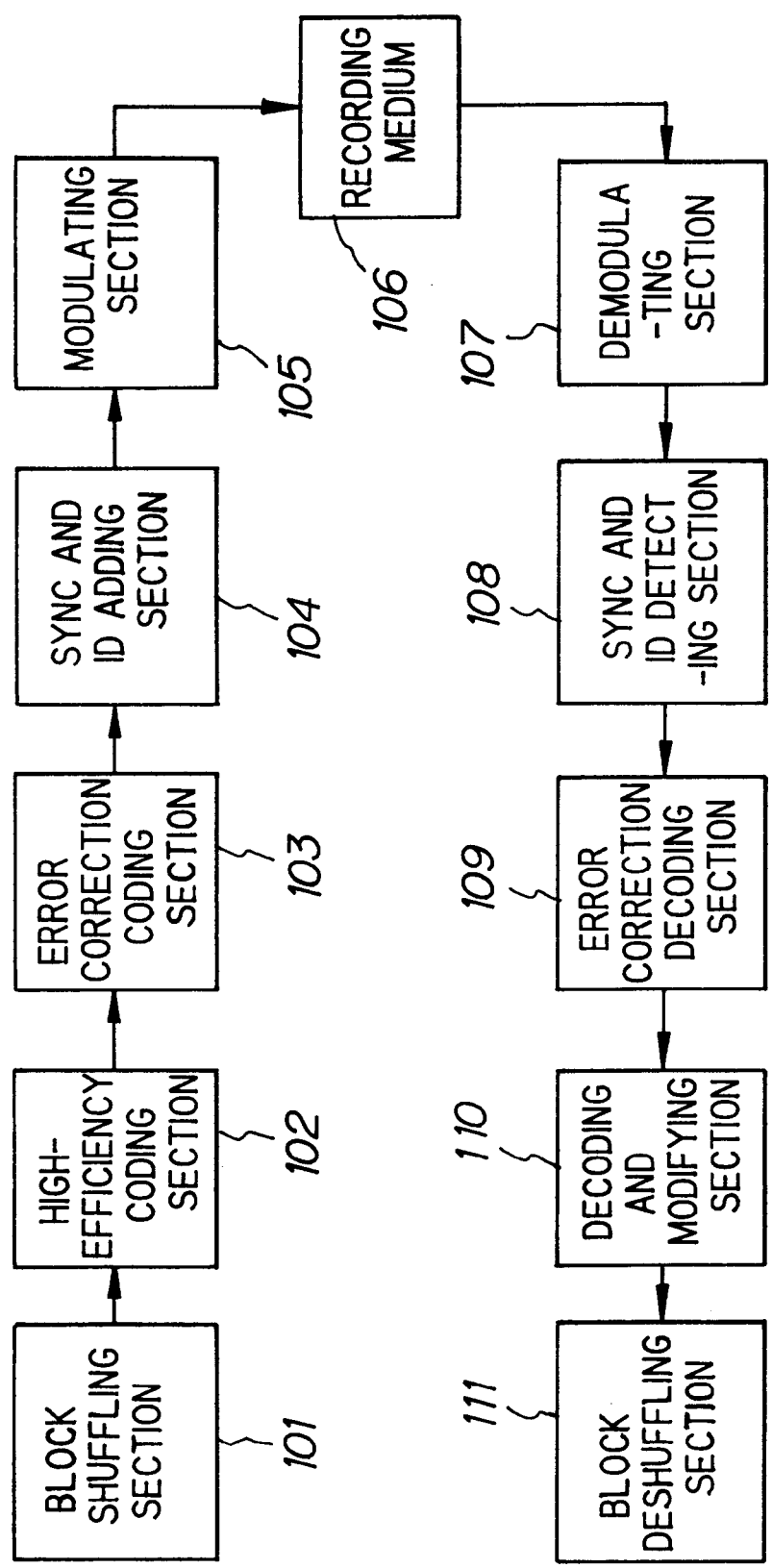
FIG. 1 is a circuit block diagram of a prior art SD-VCR.
Figure 2:
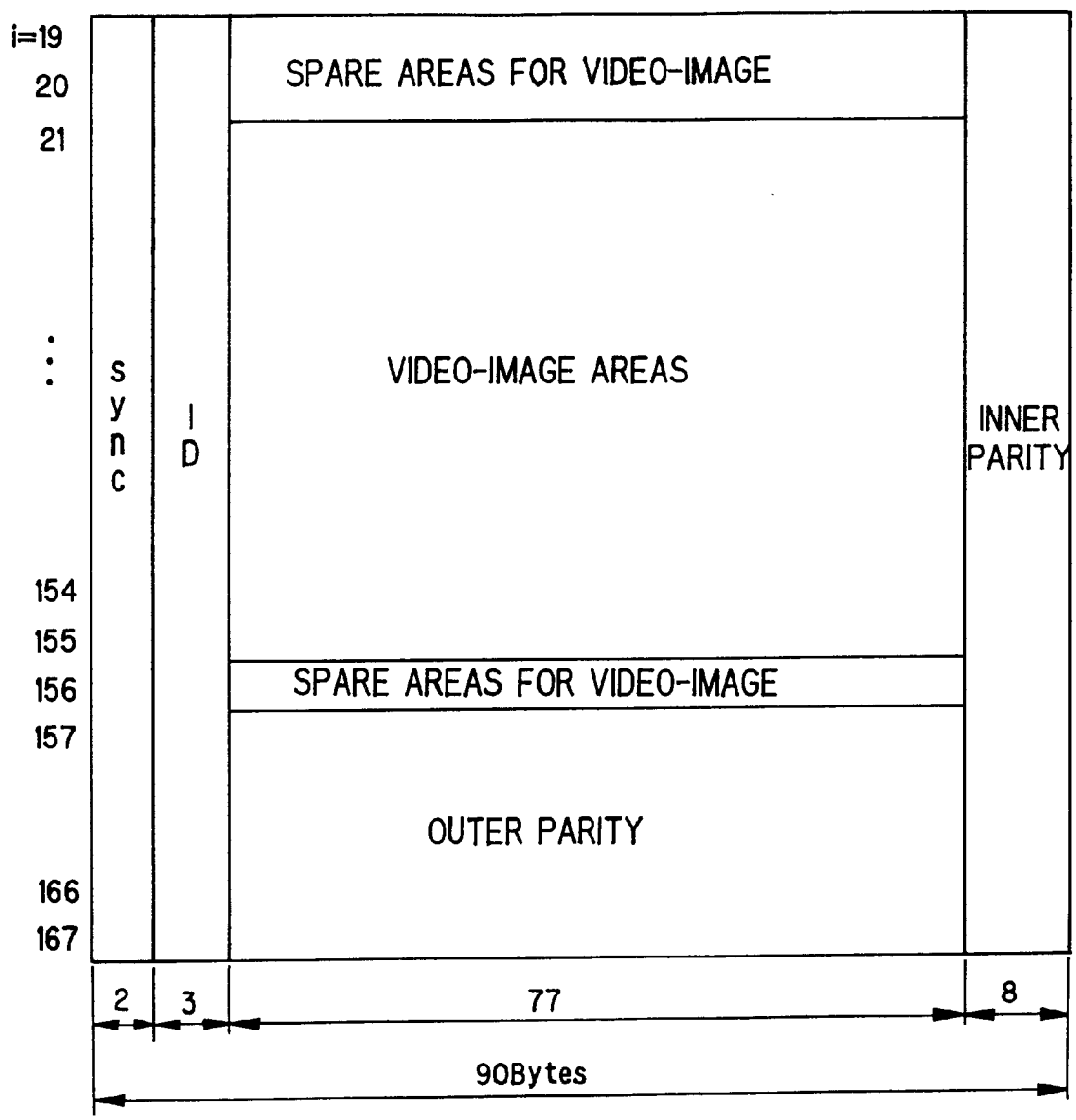
FIG. 2 is a structure of SBs of a prior art SD-VCR.
Figure 3:
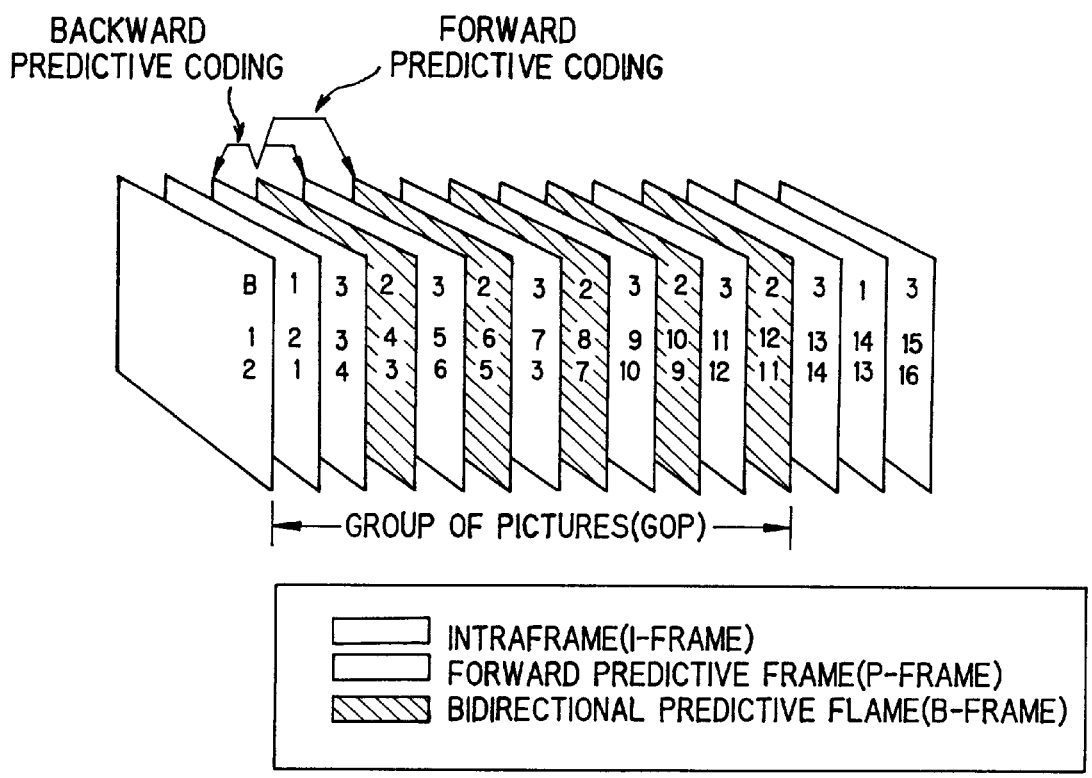
FIG. 3 is a view showing a frame structure of a packet for a typical ATV.
Figure 4A:
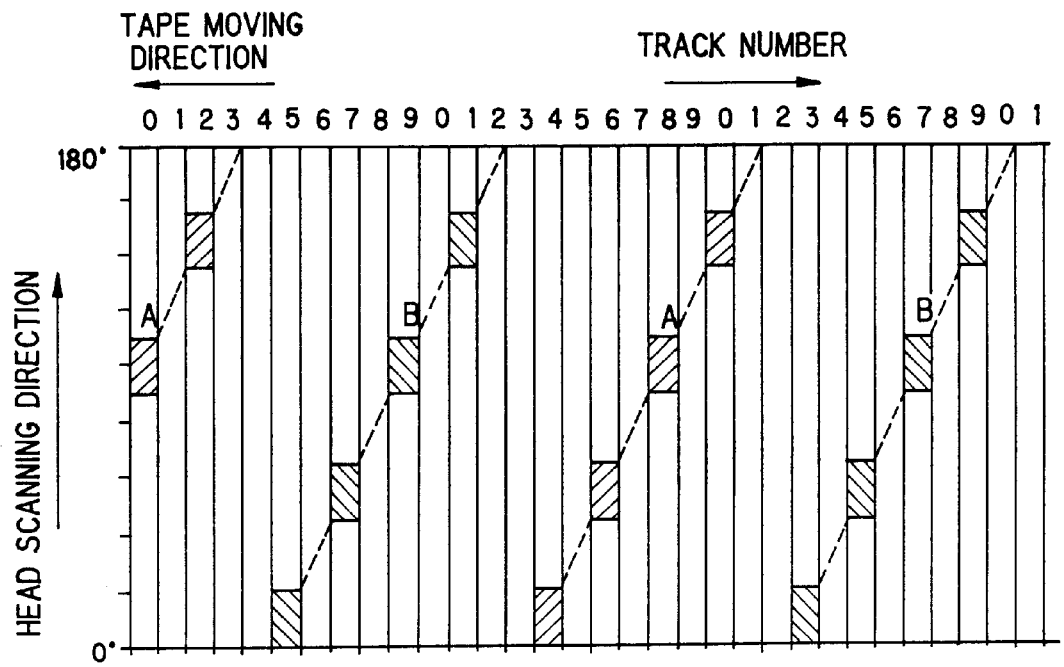
FIG. 4A is a chart showing an example of search-playback in 9x-speed mode in a prior art configuration in which a pair of single chip heads are used (arranged in radially opposite positions)
Figure 4B:
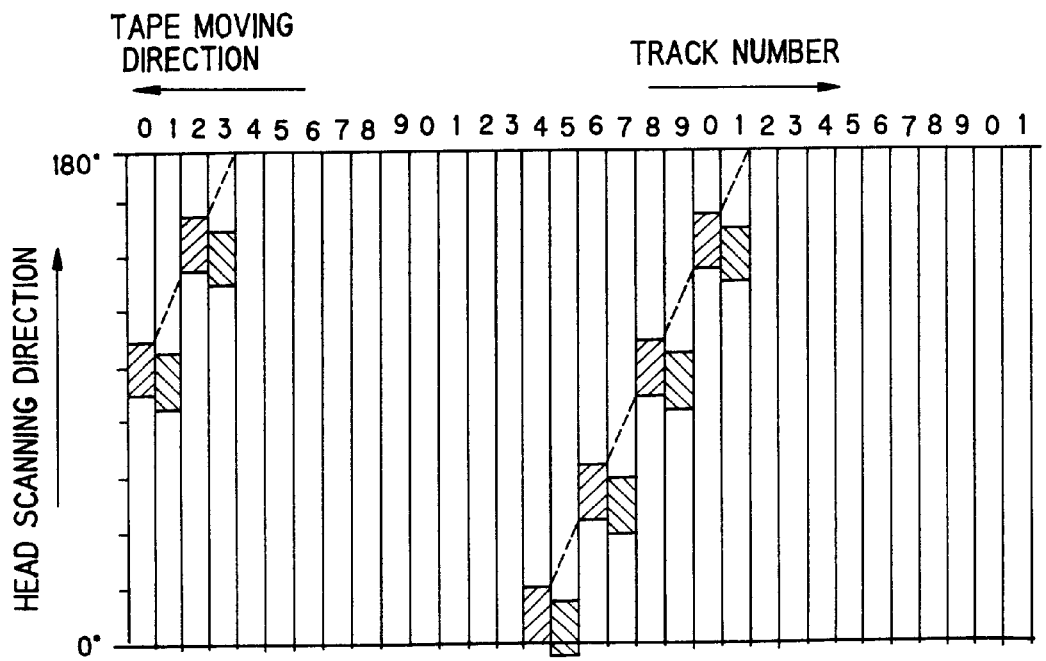
FIG. 4B is a chart showing an example of search-playback in 9x-speed mode in a prior art configuration in which a double chip head is used.
Figure 5:
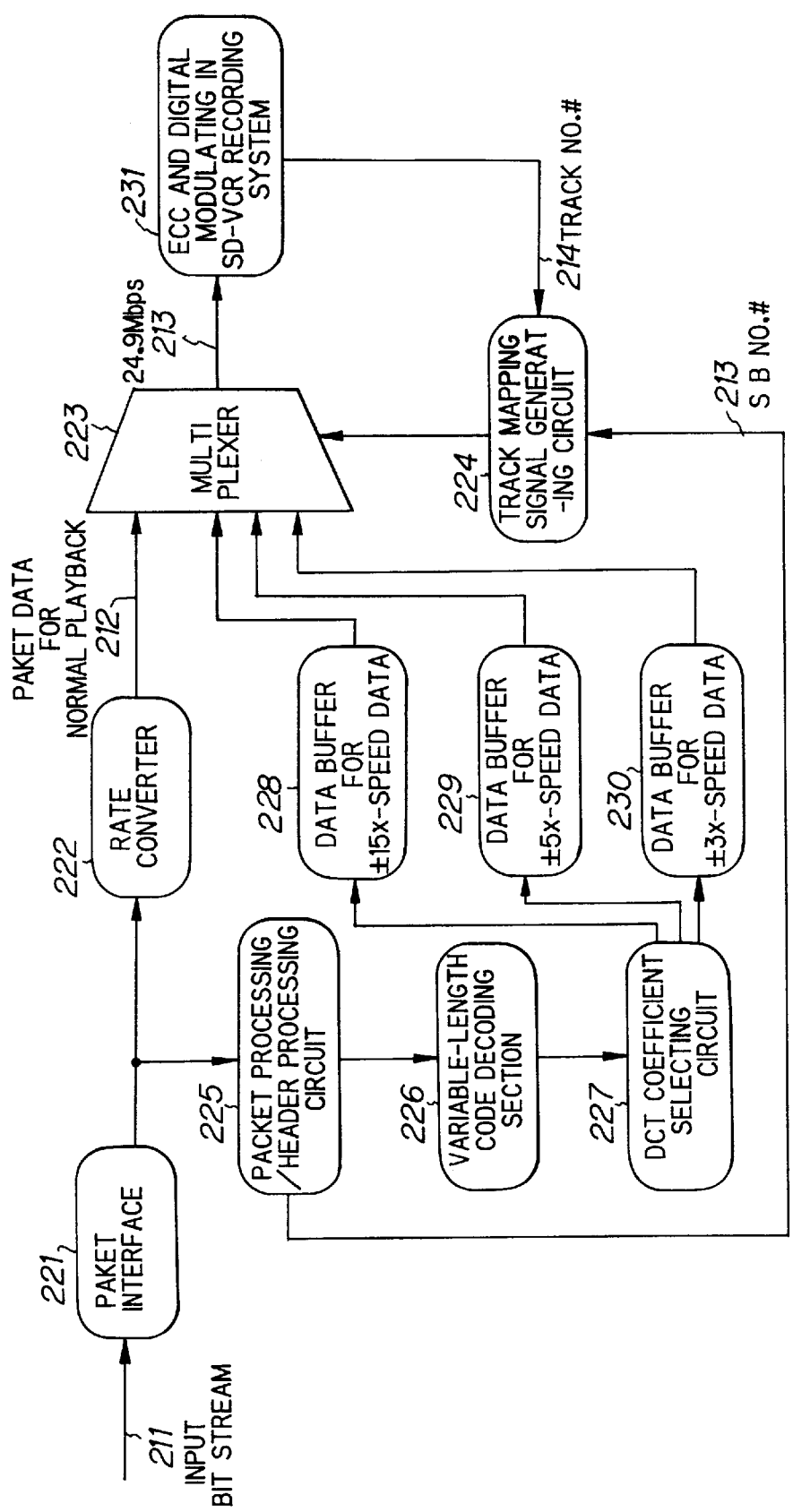
FIG. 5 is a block diagram showing a recording circuit of an embodiment of the present invention where the ATV bit stream is inputted.
Figure 6:
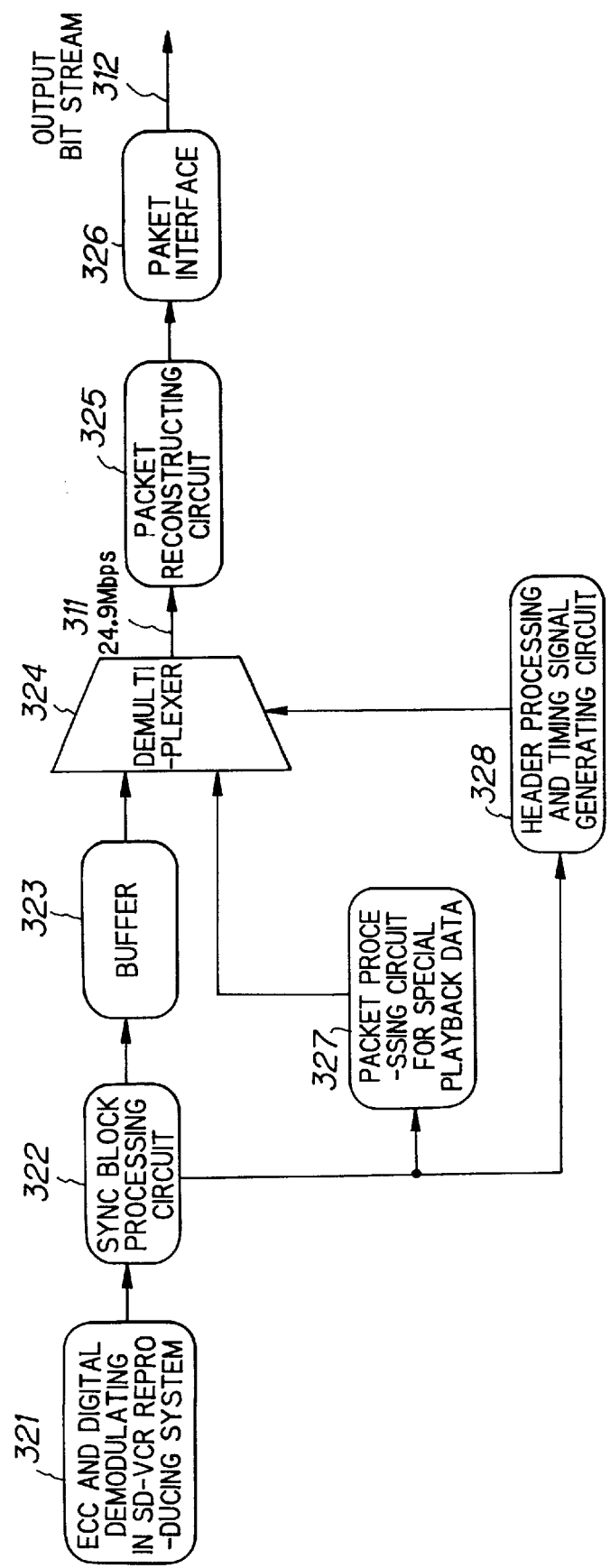
FIG. 6 is a block diagram showing a reproducing circuit of an embodiment of the present invention where the ATV bit stream is inputted.
Figure 7:
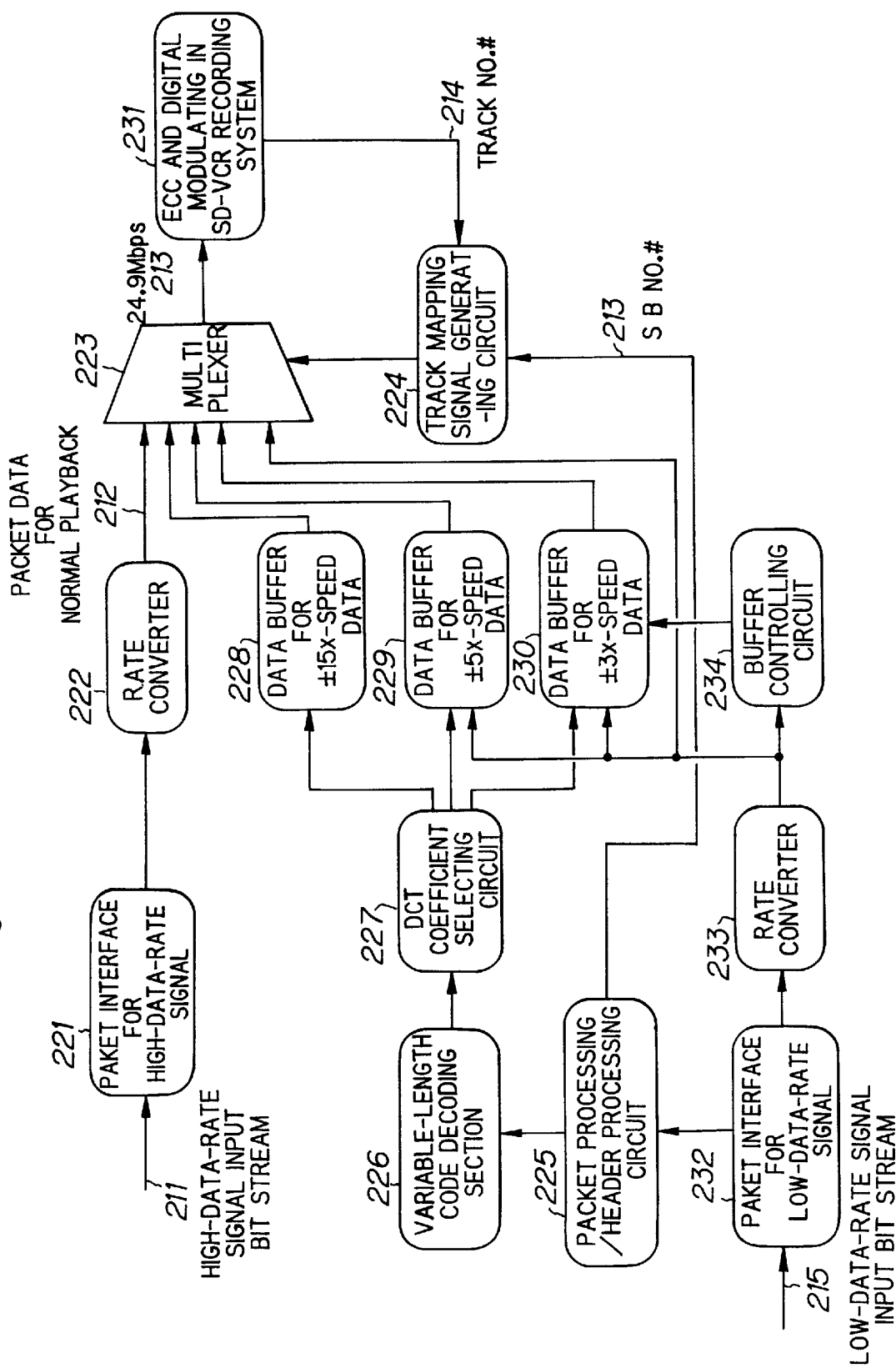
FIG. 7 is a block diagram showing a recording circuit of an embodiment of the present invention where high-data-rate and low-data rate signals are simultaneously inputted.
Figure 8:
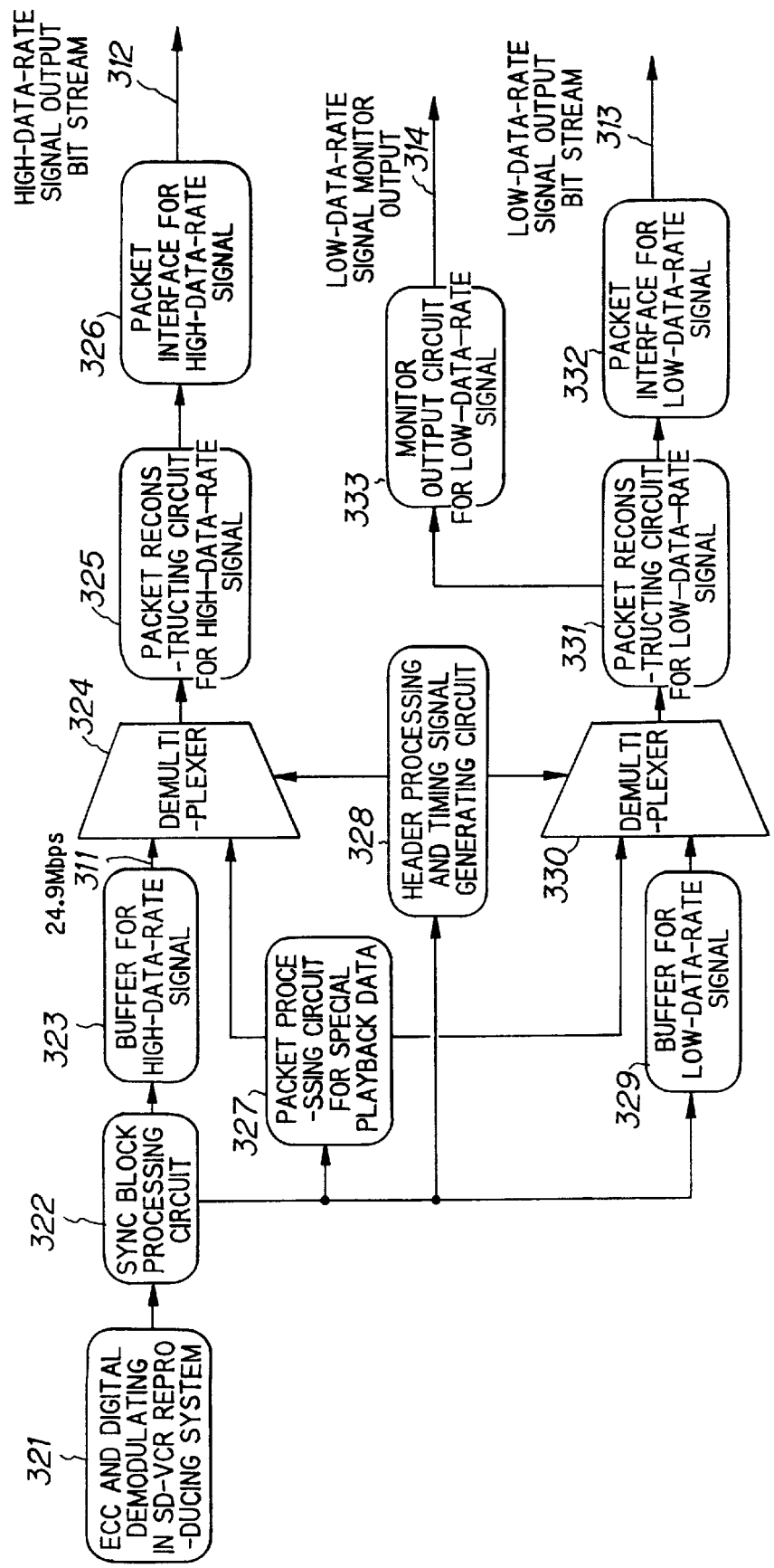
FIG. 8 is a block diagram showing a reproducing circuit of an embodiment of the present invention where high-data-rate and low-data rate signals are simultaneously inputted.

FIGS. 5 and 6 are block diagrams showing recording and reproducing parts, respectively of an embodiment of the present invention while FIGS. 7 and 8 are block diagrams showing recording and reproducing parts, respectively of another embodiment of the present invention. Although description of the present invention will be made on a SD-VCR, the present invention will not be limited to the SD-VCR system. More specifically, the present invention is independent of the error correction codes (ECC), the digital modulating and demodulating scheme, the cassette type, the mechanical configuration and the servomechanism. Any digital input and any digital VCR can be used as long as the data rate of the digital input can be adjusted to the digital VCR used and as long as the packet format can be transformed to meet the specifications of the digital VCR. FIGS. 5 and 6 show a case where the ATV bit stream signal is inputted to form data for special play. FIGS. 7 and 8 show a case where both high and low data-rate bit streams are supplied as input signals and the low data-rate bit streams are used to form data for the special play.

Therefore, the apparatus of the present invention uses the same digital modulator and demodulator, recording amplifier, reproducing amplifier, equalizer, mechanism configuration, servomechanism, cassette, etc., with those used in typical SD-VCRs.

A packet interface section 221 disposed on the input side in FIG. 5 is identical with that of a typical ATV decoder. First of all, the apparatus receives the ATV bit stream 211 and detects digital synchronizing codes to form required a timing signal from a header. That is, if a scramble flag is detected, the apparatus effects descrambling.

If an error flag in the transport layer is detected, the packet is discarded as required in the same manner as in decoding.

A signal indicating a position of a payload is picked out of an adaptation header and the header is stored as back-up in a buffer.

The apparatus effects necessary processing in accordance with flags as to the presence of PID, PES headers.

Thereafter, the apparatus starts operations of the present invention. Initially, a rate converter 222 converts the data rate. Then, as detailed hereinbelow, the input stream is converted into two classes of data streams, i.e., for the normal playback mode and the search mode.

For the case of the normal playback mode, a multiplexer 223 records entire ATV data by allotting two ATV data packets (188 bytes×2=376 bytes) on the bit stream to five SD-VTR sync blocks (to be referred to as SBs) (77 bytes (effective area)×5=385 bytes). In playback, all the data is picked up to reconstruct the original bit stream and output it. The form of the data should not be limited to the above structure. For instance, it is possible to allot nine ATV packets (1692 bytes) to twenty-two SD-VCR SBs (1694 bytes). This structure can reduce the number of waste bits, but the circuit structure becomes more complicated to some extent since the unit number of packets to be treated is large.

Figures 9A, 9B, 9C:
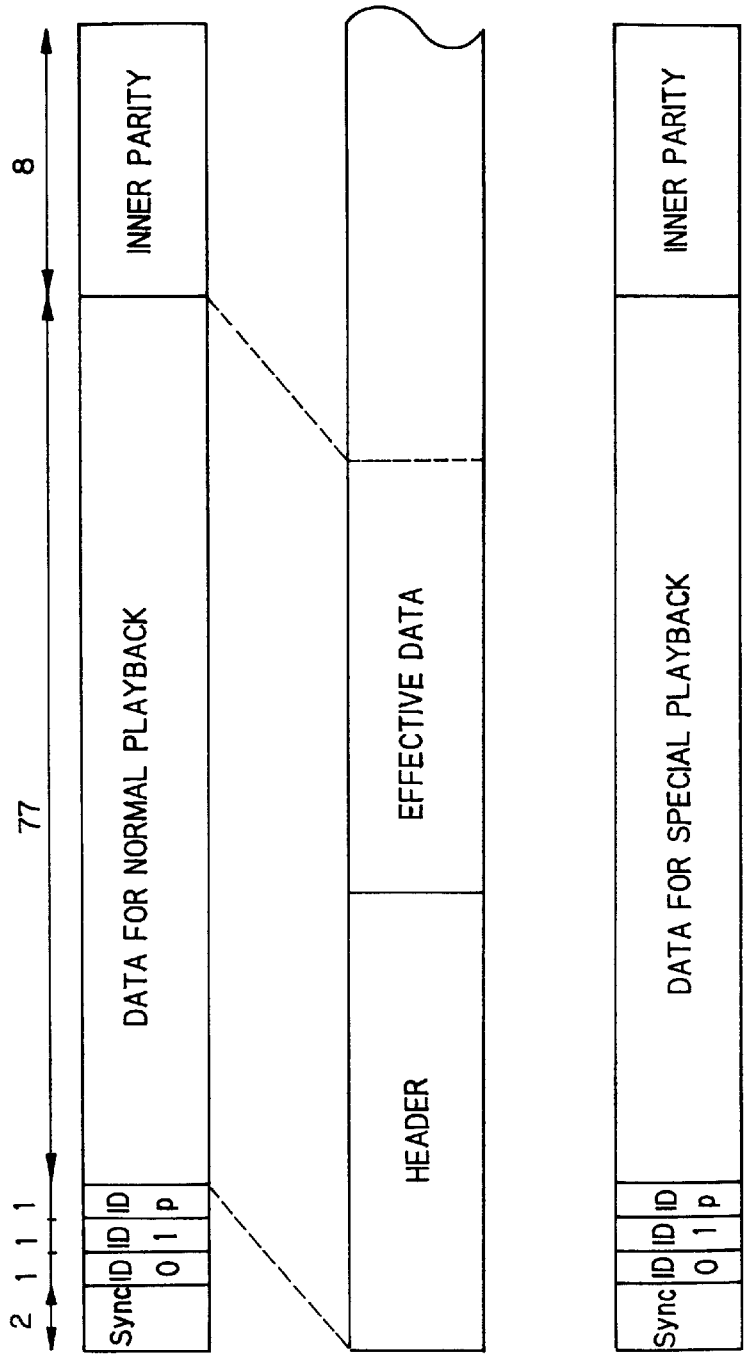
FIG. 9A is a diagram showing a packet configuration for normal playback of data-correspondence between SBs and ATV packets in the present invention.
FIG. 9B is a diagram showing an input packet of data-correspondence between SBs and ATV packets in the present invention.
FIG. 9C is a diagram showing a packet configuration for special playback of data-correspondence between SBs and ATV packets in the present invention.

FIG. 9A shows data allocation in the initial part of data packets. Here, the header and the valid data (payload) are treated in the same way. Although it is not shown in FIGS. 9A through 9C, the aforementioned header, if any, stored in the memory is inserted as back-up into the surplus nine bytes remaining in one of the five SBs. If there is no such header, pattern data which can be recognized as dummy data is inserted as stuffing bytes. Since most packets usually have the same header, it is possible to use the space for other purposes without effecting the above procedure.

For the search-playback mode, the input ATV bit stream data is processed to prepare necessary data and the thus prepared data is recorded. FIG. 9B shows an example of a data structure in a SD-VCR SB to be prepared for the special play. When operated in the search mode, the apparatus picks up the data, forms it into a packet structure which can be decoded by the ATV decoder and outputs it.

Data for search-playback modes is prepared and recorded as follows: At first, syntax of each packet is analyzed in a packet processing/header processing circuit 225 and effective data in the packet is decoded as to variable-length codes (variable-length code decoding section 226). Then, a DCT coefficient selecting circuit 227 picks out DCT coefficients from the data and selects necessary information for the search-playback from these coefficients. The thus selected DCT coefficients are used to prepare search data for each search-speed mode. In this embodiment, three classes of data, for 3×-speed mode, 5×-speed mode and 15×-speed mode, are prepared using respective data buffers 230, 229 and 228.

Then, a multiplexer 223 multiplexes the data for normal playback and the three classes of data for the search-playback modes so as to form the following tape patterns. At this stage, the data is divided into packets of 77 bytes. To effect this, a track mapping signal generating circuit 224 generates a control signal for multiplexing based on the header of a packet inputted, a SB number and a track position.

The process at recording is effected in the same manner as in the normal SD-VCR, that is, the data is subjected to error correction signals, 24-25 modulation and recorded to tape by a recording amplifier (in a digital modulating/demodulating/recorder 231 in SD-VCR reproducing system).

Here, both the normal playback and the search playback modes are effected in the same manner as in the normal SD-VCR, that is, the data, after passing through the regenerating amplifier and the equalizer, is subjected to digital modulation and error correction (in a digital demodulating/ECC 321 in SD-VCR reproducing system).

Then, the apparatus effects operations of the present invention. That is, a SB data processing circuit 322 discriminates the SB data of the signal thus picked up and error-corrected.

At the normal playback mode, a buffer 323 controls the timing of the signal from the SB data processing circuit 322 and outputs the signal to a demultiplexer 324, which in turn processes the data so as to be equal to the original packets. A packet reconstructing circuit 325 effects rate transform and adds headers etc., and outputs the resulting data via a packet interface 326.

At the search-playback mode, after the same data discrimination is done in the SB data processing circuit 322, a special-playback-data packet processing circuit 327 constructs data from the header, valid data, data to be invalid (stuffing bytes). The stuffing bytes are inserted so that the final data becomes a packet of 188 bytes.

If there is any uncorrectable data in a header, the header is replaced with a header previously reproduced and stored for back-up to form a packet.

Switching between the normal playback data and the special-playback data as well as the control of the output timing of the special-playback data is effected by the demultiplexer 324 while the control signal is generated by a header processing and timing signal generating circuit 328.

Figure 11:
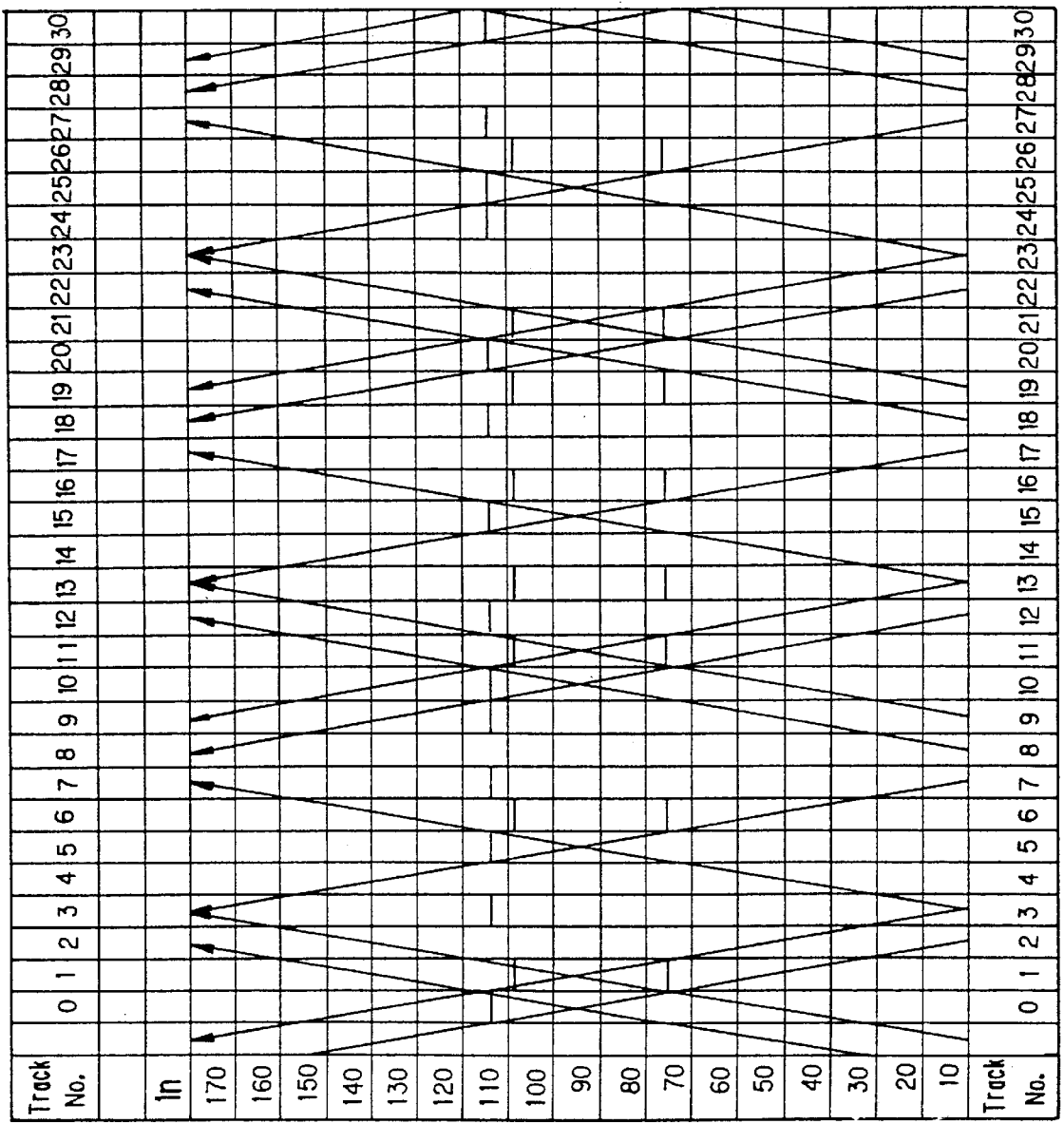
FIG. 11 is a diagram showing a data-layout on the tape for search-playback operation in the present invention.

Next, description will be made on the tape patterns. FIGS. 10A and 10B show a structure of data arrangement on one track. In these figures, the data is represented by SB units arranged in the track direction. The data for 5×-speed mode and 3×-speed mode is disposed in an approximately middle portion of the track as shown in FIG. 10A. This arrangement allows the data for 5×-speed mode and 3×-speed mode to be shared. The data for 15×-speed mode is divided into five segments arranged as shown in FIG. 10B. FIG. 11 shows the layout on the tape. Since 15 is the least common multiple (l.c.m.) of 3, 5, and 15, the double of 15, i.e., 30 tracks are selected to be the one cycle of the signal processing. In the present invention, some or several classes of search-playback speed modes are set up in such a manner that the l.c.m. of the search speeds or the multiple of the l.c.m. is selected as the cycle of the signal processing. This is one of the main features of the present invention.

Two kinds of head arrangement are considered for the present invention. The first configuration includes two heads arranged on a common substrate like a double azimuth head (the case where a double-chip head is used); the second configuration has two heads arranged at radially opposite positions (the case where single chip heads are used). In each head, azimuthal angles are made different as in the normal VCR. The heights of the heads are adjusted in a proper manner. That is, the data traced by either one of the two heads on the double-chip head is recorded on recording areas traced by only the single chip head. This is one of the main features of the present invention.

Figure 12:
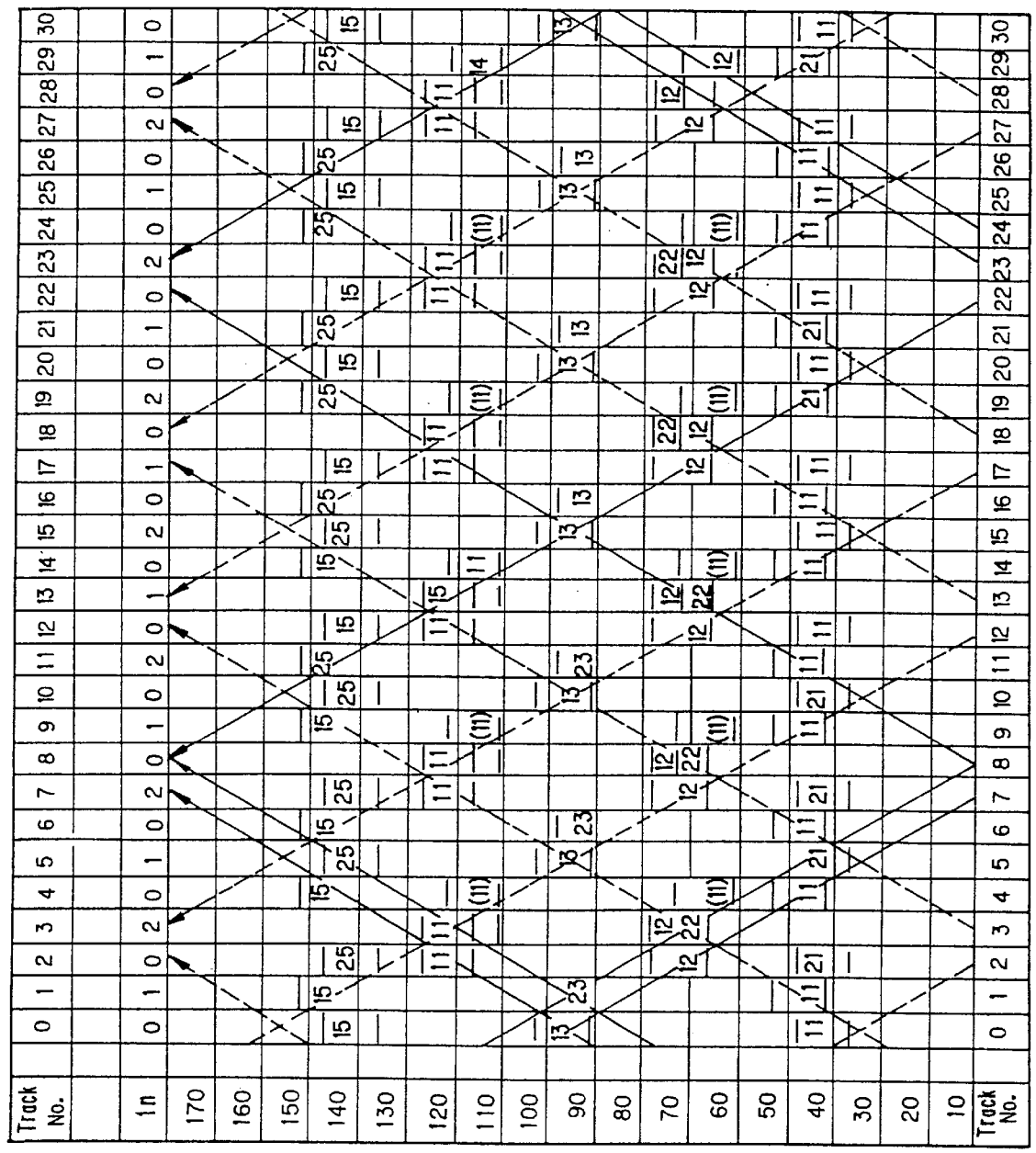
FIG. 12 is a diagram showing head traces for 15x-search-playback operation in the present invention and a data-layout therefor.
Figure 13:
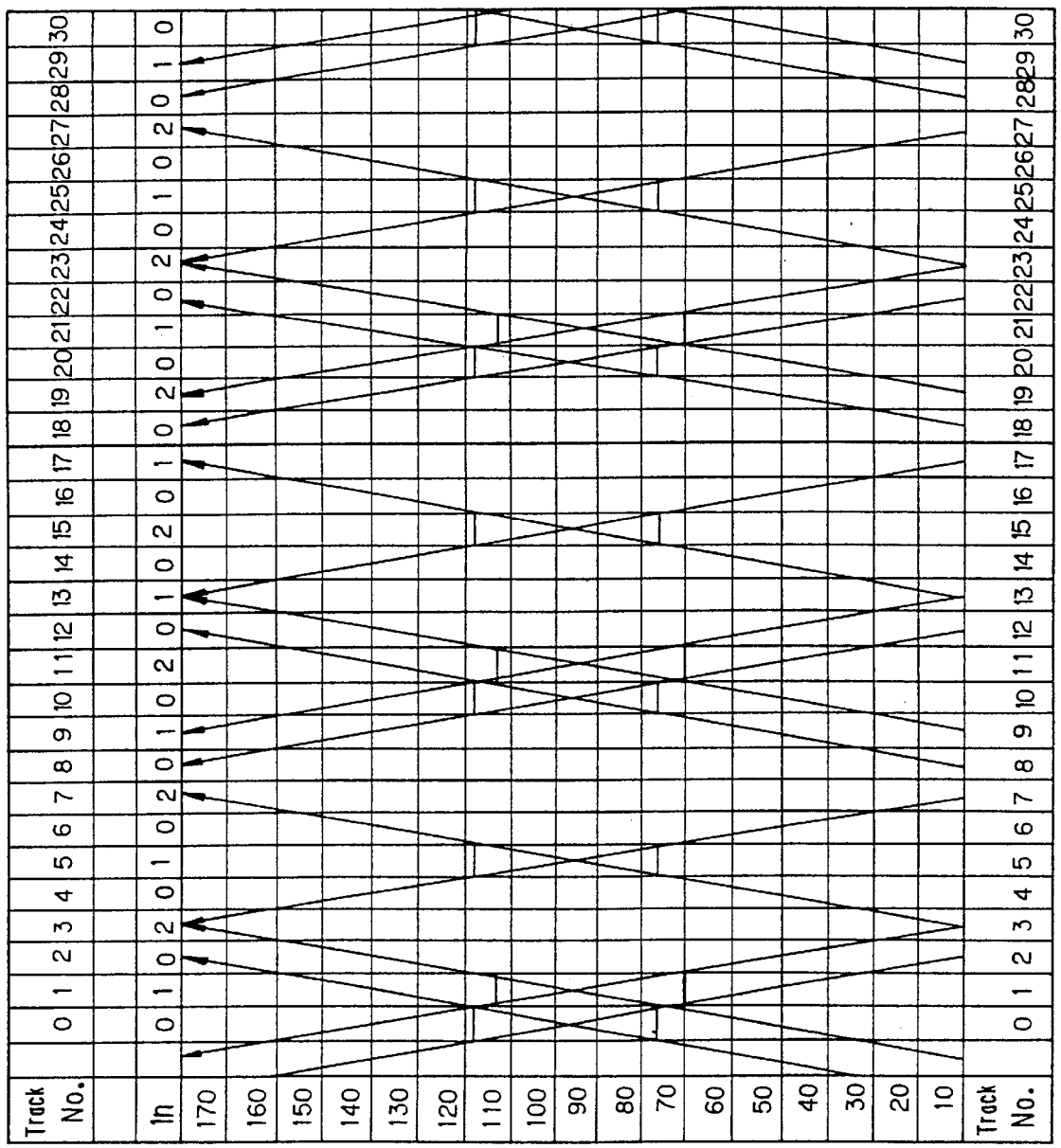
FIG. 13 is a diagram showing head traces for 5x-search-playback operation in the present invention and a data-layout therefor.
Figure 14:
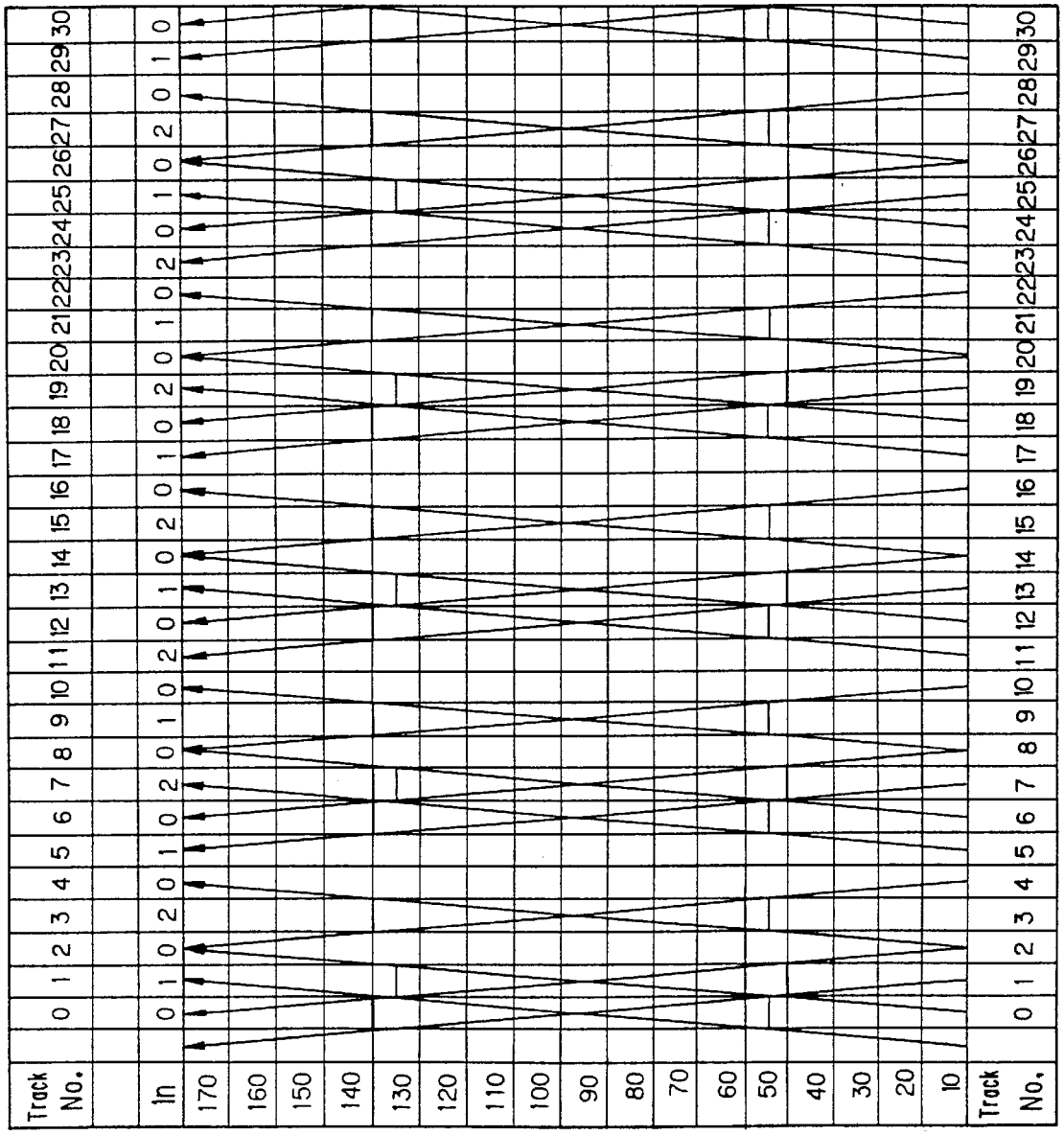
FIG. 14 is a diagram showing head traces for 3x-search-playback operation in the present invention and a data-layout therefor.

FIGS. 12, 13 and 14 show head traces on the tape for 15×-speed mode, 5×-speed mode and 3×-speed mode, respectively, and each show relations between the traces and positions of data for the corresponding search-playback mode.

In the case of 15×-speed mode, two heads make two traces for each unit made of 30 tracks. Accordingly, there exists ten reproducible areas within every 30 tracks and each reproducible area is able to record 10 SBs or less. In accordance with one of main features of the present invention, since the same data segments are repeatedly arranged for every five tracks in order to facilitate the forward and reverse search-playback operations, it is possible to make short the time for finding the data which can be retraced. In other words, this configuration makes short the time taken for locking the clock for start of searching and for data synchronization and the like (see FIG. 12 ).

In the case of 5×- and 3×-speed modes, under consideration of the two kinds of the head arrangement and the forward and reverse search-playback operations, middle part of the tracks on the tape is used as recording areas so that about 30 SBs, for instance, can be retraced within each of the recording areas (see FIGS. 13 and 14).

The amount of data is shown in the following tables. Values in the tables are estimated considering the interchangeability, on condition that the data becomes effective when the amplitude of the data is equal to or over half of that in the normal playback operation. In the tables, the sync block is represented by SB.

TABLE 1

The number of SBs in which data for search-playback modes is written
(Data is duplicated for allowing the system to effect reverse search and cope with different head arrangements and the other factors. The number of the duplicated data is counted. Of the search-playback data for different speed modes, the number of the common data is not counted.)

|  | Number of Areas | Number of SBs inside an area | Total number of SBs | |
|---|---|---|---|---|
| 15x-speed | 12 | 10 | 120 | (1) |
| 5x-speed | 12 | 30 | 360 | (2) |
| 3x-speed | 15 | 30 | 450 | (3) |
| Portions shared by 5x- and 3x-speed modes | −6 | −30 | −180 | (4) |
| Total |  |  | 750 SBs | (5) |

TABLE 2

The amount of data to be read out at search-playback
(The amount of data to actually be displayed on the monitor with the duplicated data uncounted.)

|  | Number of Areas | Number of SBs inside an area | Total number of SBS | |
|---|---|---|---|---|
| 15x-speed | 2 | 10 | 20 | As the data sum of 12 frames forms one I-picture, 120 SBs (6) |
| 5x-speed | 6 | 30 | 180 | (7) |
| 3x-speed | 10 | 30 | 300 | (8) |
| Total |  |  | 500 SBs | (9) |

TABLE 3

The amount of data which is available for searching

| Data rate for SD-VCR input | 24.94 Mbps | 4048 SBs* |
|---|---|---|
| ATV Bit stream | 19.30 Mbps | 3133 SBs* |
| Difference between the two | 5.64 Mbps | 915 SBs* |

*The number of SBs in 30 tracks on condition that data is allotted equally to all the tracks.

As apparent from (10), the number of SBs in which data recording is allowed is greater than the data to be recorded, so that data can be reproduced in any of the search-playback modes without any problem.

Nevertheless, when factors such as the forward and reverse search-playback operations, the kinds of head arrangement, increasing the number of starting positions for search-playback and the like are to be considered, it is necessary to record duplicated data. For this reason, it is impossible to assign all the data-recording allowing areas (915 bytes) for recording data without duplication and the amount of data actually recorded without duplication is reduced by half.

As understood from the comparisons between (1) and (6), (2) and (7) and (3) and (8), there are 250 SBs of redundant data in 30 tracks (750 (5) - 500 (9)). Here, it is advantageous that there are 180 SBs (4) of data which can be shared by the 3x- and 5x-speed modes.

Strictly speaking, the data for 15x-speed mode can be shared to some extent. In the case of 15x-speed mode, however, it is necessary to increase the number of the duplicated data so as to increase the number of positions at which the data can be formed into output packets to the decoder as soon as the searching operation is started ((1) and (6)).

The remaining sync blocks (165 SBs (10)) are used to increase the number of duplicated portions for enhancing the precision considering the interchange, as well as to provide dedicated SBs for recording just headers for backup thereof.

Next, a structure of the data for the search modes will be detailed. In a case where data for searching is prepared from the ATV bit stream, suppose each GOP consisting of 12 frames and only one of them, namely I-picture is used for the search data, the data for searching is constructed as follows. (Here, the signal component ratio of chrominance signals is 4:1:1, and 120 tracks for 12 frames correspond to one I-picture.) The number of DCT blocks in a single frame :

1,920×1,080/64=32,400

Suppose that one byte is allotted for the d.c. component of Y-signal and chrominance signals, 0.8 byte is allotted for the two a.c. component coefficients having the lowest frequency, and the data is allotted equally to 30 tracks. In this case, the number of SBs within 30 tracks is: 284.1 SBs (<300 SBs (8), the remainder: 15 (11)), therefore this allocation can be used for recording 3x-speed search data.

If one byte is allotted in total for the d.c. component of Y-signal and chrominance signals, the number of SBs is: 157.8 SBs (<180 SBs (7), the remainder 22 (12)), therefore this allocation can be used for recording 5x-speed search data.

When 0.76 byte is allotted for the d.c. component of Y-signal for every four DCT block, the number of SBs is 20.0 SBs (=20 SBs (5), the remainder: 0 (13)), therefore this allocation can be used for recording 15x-speed search data. In this case, the remaining sync blocks (11), (12) and (13) are used for protecting headers and the like. More specifically, the remaining SBs (11), (12) and (13) total to 27 SBs, which are allotted dedicatedly for recording headers and if any header is found to be erroneous and uncorrectable at search-playback, the whole header of errors is replaced by the header recorded as backup.

In this case, each SB is numbered with a sub-code of the VCR packet for the search data. The SB for backing up headers is provided with a header for the processing. The header for replacing an erroneous header is constructed by the SB number for the original header and the number of bits of the header to be replaced.

The above description is made on the case where data for normal playback and special playback is created from the ATV bit stream, but this method can also be applied to image data which conforms with the MPEG 2. This situation will be described referring to a specific embodiment in which the ATV stream is recorded as it is in the same manner as above and data for special playback is formed from NTSC information which is data-compressed based on the MPEG 2. FIGS. 7 and 8 show block diagrams showing circuits for the embodiment. Here, there is no need to change the tape pattern and only the structure of the search data is modified (the signal component ratio of chrominance signals is 4:1:1).

The number of DCT blocks in a single frame:

720×480/64=5,400

When one byte each is allotted for the d.c. component of Y-signal and for the d.c. component of chrominance signals of one I-picture, the number of SBs is:

106 SBs (<120 SBs (6), the remainder:14), therefore this data is used as 15x-speed search data to reconstruct a single I-picture of d.c. components for 12 frames.

Searching data to be described next is constructed so that, unlike those described heretofore, one frame corresponds to 30 tracks. When one byte is allotted in total for the d.c. component of Y-signal and chrominance signals of I-picture and P-picture and 0.5 byte is allotted for the two a.c. component coefficients having the lowest frequency, the number of SBs is:

5,400×1.5×1.5/77=157.7

(<180 SBs (7), the remainder: 22).

Therefore, this allocation can be used for recording 5x-speed search data. In this case, recording is effected so that four frames of five are omitted without dropping any I-pictures. In displaying, still more selected data is displayed. In this method, at data-recording, information on movement in the pictures is recorded so that the information on the movement can be used to select subsequent picture data.

In this case, the reproduced images produce more smooth animation than those obtained from the 15x-speed data. That is, the quality of images improves with respect to time-development (the time-resolution of pictures improves.)

Similarly, when one byte is allotted for the d.c. component of Y-signal and chrominance signals of I-picture and P-picture, one byte is allotted in total for the two a.c. component coefficients having the lowest frequency and 0.8 byte is allotted in total for the three subsequently significant coefficients having the second-lowest frequency, the number of SBs is:

5,400×1.5×2.8/77=294.6

(<300 SBs (8), the remainder: 5).

Therefore, this allocation can be used for recording 3x-speed search data. In this case, the quality of image improves with respect to the frequency characteristics as compared to that of the 5x-speed search data by the added a.c. components. In this case, two frames of three are omitted to effect the display.

FIG. 15A shows positional relations of normal playback data and search data on tracks within a single GOP period and FIG. 15B is a timing chart of the display frames of those data with the passage of time. As shown in FIG. 15A, a GOP is composed of an I-picture in the beginning and eleven, in total, P- and B-pictures. Although one GOP composed of 12 frames is shown in this embodiment, the number of frames in a single GOP should not be limited to this. For each of 3x- and 5x-speed data, I1, P11, P12 and P13 are recorded in every 30 tracks (equivalent to three-frames interval). Here, I and P denote I-picture and P-picture, respectively. The subscripts indicate the order of the pictures for convenience and have nothing to do with data content. A first numeral subscript indicates the order of the GOP while a next numeral subscript designates the order inside the GOP. As to the alphabetical subscript in the figures, 'a', 'b' and 'c' denote modes of the search data, or 3x-speed mode, 5x-speed mode and 15x-speed mode, respectively. I1$a$ for 15x-speed mode is recorded across 120 tracks or in the interval of 12 frames. If completely identical data is recorded as search data for 3x-, 5x- and 15x-speed modes, reproduced images for all the modes are equal as to quality of image despite the difference of the amount of data to be read out. Nevertheless, as commonly used data is increased, the system improves in efficiency, needing fewer circuits. In this embodiment, the data structure is designed so that common data is used as much as possible and different kinds of data are distributed to different SBs within the limit of possibility to thereby make the data independent.

FIG. 15B shows displaying conditions of the search-playback modes in comparison with that of the normal playback mode. In the case of the 3x-speed search mode, the system reproduces an I-picture and then reconstructs an image named p11 based on the image I1 and image data on P11$a$, to thereby display the image p11. The system, next, effects successive displaying of images p12 and p13 and then displays an image i1. This sequence of operation will be repeatedly effected.

In the case of the 5x-speed search mode, although tracing of data for one frame is not in time with the displaying, this gives no inconvenience for outputting the data as a packet. However, the decoder renews the data by every slicing unit and is required to display the renewed data at all times. To achieve this, there are needs for setting a flag that indicates the special playback mode and for renewing such data as a time stamp and the like. These operations are carried out in the packet reconstructing circuit 325.

The decoder using variable-length codes should be constructed so as to decode the codes of the search data encoded when the data is recorded in the VCR. Since the DCT coefficients are shortened by using a d.c. component, a few a.c. components and EOD (end of data), it is possible to shorten the data rate even using the same variable-length codes. Accordingly, it is possible for the decoder to decode the data without any problem if the time span of the data in the search mode is shorter than that of the bit stream at input.

From the above two points, it is possible to decode the search-mode bit-stream and display the decoded search data without any special modification of the structure of the decoder.

Since in the 5x-speed mode the renewal of images is done faster than the display of one frame, some of the image data is skipped. Therefore, both the spatial resolution and the resolution with respect to time take intermediate values between those of the 3x-speed mode the 15x-speed mode.

It is also possible to construct the 5x-speed mode data as follows (FIGS. 16A and 16B) without making any change in the searching data for the 3x-speed and 15x-speed modes. Different features from the above data construction are that the spatial resolution of images in the 5x-speed mode becomes equal to that of the 3x-speed mode while the time-resolution of the pictures is in proportion to the searching speed. When one byte is allotted for the d.c. component of I-picture and P-picture, one byte, in total, is allotted for the two a.c. component coefficients having the lowest frequency, and 0.7 byte is allotted in total for the three a.c. component coefficients having the second-lowest frequency, the number of SBs is:

5,400×1.5×2.7×3/(5×77)=170.4

(<180 SBs (7), the remainder: 9).

Thus, in this scheme, it is possible to make a trade-off between the spatial resolution and the time-resolution within a certain limited range. The combination of the spatial and time resolutions should not be limited to the above combination and can be changed. The resolutions may change depending upon the input image format. This configuration is able to cope with such a situation.

The allocation of the resolutions can be made responsive to software so as to allow the user to select a desired mode of quality of image in the picture search from several predetermined combinations of time and spatial resolutions.

The amount of readable data at each of the searching speeds can be calculated as follows:

(6) 120×2.5×77×8 184.8 Kbps
(7) 180×10×77×8 =924 Kbps
(8) 300×10×77×8 =1.848 Mbps Accordingly, any digital signal having a bit rate of 1.848 Mbps or less can be recorded as it is together with the ATV bit stream and can be used as searching data for special playback. In other words, regardless of the number of frames in a GOP, it is possible to necessarily reproduce all the data in the 3×-speed search mode to recover the picture. Therefore, when the reproduced data is to be displayed, the data is thinned in such a manner that one frame is selected from every three frames. To cope with scene-changes and the like, a special control may be considered.

In the 5×-speed search mode, only 50% of the data (924 Kbps as above) can be picked up. Therefore, almost all the data for I-pictures can be read usually, but few failures of picking up I-pictures could occur. There must not be so much difference between the original data image of I-picture and the original data image of P- or B-picture in the same GOP. Further, in most cases, the original I-picture must not differ so much from the I-picture in a neighboring GOP. Accordingly, the renewal of image data within the limit of possibility, allows images to be displayed which can anyhow be used for the searching operation.

In a case where a GOP is composed of 2.5 or less number of frames, distributing the data on the I-picture throughout the GOP makes it possible for all the data on the I-picture to be read out.

In this case, if there is a scene change in the data, the interval between I-pictures could become short. Therefore, there could happen to be not enough data to recover the original image. However, this defect does not pose any significant problem since in the search mode there is no need to recognize a boundary point between scenes and the user will operate the system in the normal or slow-motion mode to locate the boundary point.

If the occupying ratio of data on I-pictures to the entire data is equal or below 50%, the data on I-pictures must always be read out so that there is no possibility to fail to recover I-pictures. Depending on the ratio of the data, data on P-pictures can be made to read out. If a GOP is composed of less than 5 frames, the data may be properly thinned.

Since in the 15×-speed mode, the amount of data to be picked up is one-tenth as much as in the normal mode, it is necessary to select significant DCT coefficients and record them as described above.

In the 3×-speed mode, the reproduced data must be thinned after all. This is because the system is adapted to cope with the 5×-, 15×-speed modes, reverse-search mode as well as two kinds of head arrangement. Therefore it is impossible to make the data rate higher than 1.848 Mbps because of the limited recording areas. If the above conditions to deal with can be reduced, the data rate to be recorded can be increased.

Although the description of the present invention has been made on the embodiment in which the ATV bit stream is used as the input signal, any signal can be applied as stated above as long as it is in conformity with the MPEG. Accordingly, if the bit rate of the input signal is 18 Mbps in place of 20 Mbps, the data rate which can be used for the special playback mode is 7 Mbps, the data rate of the low-bit-rate signal is increased by 2 Mbps so that it is possible to record a signal of 3.848 Mbps.

In this case, some I-pictures may be picked up entirely or the others may not be picked up all in the 3×-speed mode. In such a case, it is possible to manage the function of searching by renewing the image data as much as possible.

It is necessary to record the data by selecting DCT coefficients and distributing them to different SBs as effected for the 5×- and 15×-speed modes in the first embodiment of the present invention.

It was mentioned in the above description that 30 SBs could be read from the single area in the 3×-speed mode, but actually, about 70 SBs can be read. In the above case, areas to be taken for the special playback modes were limited, so that it was just impossible to ensure the areas more than 30 SBs. However, in this case, it is possible to increase the areas to use them for the special playback modes.

Advantage in the case of the 3×-speed mode is that data of the input signal of low-data rate can be used as it is, but the data cannot be used in common with the search data for 5×-speed mode. When 70 SBs are used for the 3×-speed mode, the amount of data can be re-calculated as follows on condition that the system is able to effect reverse-search and is responsive to the two types of head arrangement.

TABLE 4

The number of SBs in which data for search-playback modes is written
(Data is duplicated for allowing the system to effect reverse search and cope with different head arrangements and the other factors.)

|  | Number of Areas | Number of SBs inside an area | Total number of SBs |  |
|---|---|---|---|---|
| 15×-speed | 12 | 10 | 120 | (1) |
| 5×-speed | 12 | 30 | 360 | (2) |
| 3×-speed | 15 | 30 | 1,050 | (3) |
| Portions shared by 5×- and 3×-speed modes | 0 | 0 | 0 | (4) |
| Total |  |  | 1,530 SBs | (5) |

TABLE 5

The amount of data to be read out at search-playback
(The amount of data to actually be displayed on the monitor.)

|  | Number of Areas | Number of SBs inside an area | Total number of SBs |  |
|---|---|---|---|---|
| 15×-speed | 2 | 10 | 20 | As the data sum of 12 frames forms one I-picture, 120 SBs (6) |
| 5×-speed | 6 | 30 | 180 | (7) |
| 3×-speed | 10 | 70 | 700 | (8) |

The amount of data to be used for search-playback:
Input data rate to SD-VCR : 24.94 Mbps 4,048 SBs *1
Data rate usable for the input signal of the low-data rate:
1530×10×77×8=9.42 Mbps 1,530 SBs *1
The difference between the above two values
15.52 Mbps 2,518 SBs *1
*1: The number of SBs in 30 tracks on condition that data is allotted equally to all the tracks.

Thus, the data rate of the high-data rate signal which must be the major video signal component is 15.52 Mbps.

In view of the interchangeability, the system will do well enough if the data rate of the high-data-rate input signal is set to be 15 Mbps and the data rate of the low-data-rate input signal is set to be 9 Mbps, in order to ensure further margin for the amplitudes of the digital signal at the time of the detection.

The present invention is to provide a recording apparatus for recording television signal having a wide band-range for the ATV, HDTV or the like which, in recent years, attracts a good deal of public attention as a near-future television apparatus of high quality of image with a wide display. That is, the present invention is to provide a digital VTR which is able to cope with the simultaneous broadcasting by creating a relatively high bit-rate signal (17 to 60 Mbps after the band-compression) and a relatively low-bit-rate signal (1.5 to 5 Mbps with valid samples halved, valid lines halved) and utilizing the relatively low-bit-rate signal as a signal for the special playback. Application of the present invention to a digital VTR enables the system to cope with the near-future simultaneous broadcasting starting. Further, it was very difficulty for the digital VTR adopting the high-efficiency coding scheme to reproduce smoothly animated picture in the search-playback mode, but the present invention enables the system to overcome the difficulty.

Since the recording and reproducing apparatus of the present invention is capable of not only effecting search-playback of the SDTV signal but also reproducing normal pictures from the SDTV signal, it is possible to provide a low-priced display of the SDTV type for a portable DVCR. Further, the present invention allows terminal displays for multimedia network to display without making any modification of the signal scheme.

What is claimed is:

1. A digital recording and reproducing apparatus for recording and reproducing a HDTV high-resolution digital image signal, comprising:

means for recording said high resolution signal and a SDTV low resolution signal for a normal playback speed in a normal playback mode, said low resolution signal formed by converting at least a part of an encoding scheme of said high resolution signal; and means for setting a plurality of predetermined special playback speeds in a plurality of special playback modes which are higher than said normal playback speed, at multiples of said normal playback speed so that factors of said plurality of plural special playback speeds have at least a common multiple of l.c.m., for setting a multiple of a plurality of recording tracks for one frame period equal to l.c.m. or a multiple thereof, so that a recording track pattern will have the periodicity of said multiple of said plurality of recording tracks for one frame period at any of said predetermined special playback speeds, thereby facilitating simple processing of a plurality of special plural signals, and for recording said high-resolution signal, said low-resolution signal, and at least one of said plurality of special playback signals, each signal having identical content but differing resolution in a thus created recording area, wherein said high-resolution and low-resolution signals are reproduced in said normal playback mode at said normal playback speed, said low-resolution signal further reproduced in at least one of said plurality of special playback modes at at least one of said plurality of special playback speeds.

2. The digital recording and reproducing apparatus according to claim 1, further including:

means for hierarchically reducing spatial resolution of a recording signal for said plurality of special playback speeds by removing at least part of the high-frequency components of said low-resolution signal in a hierarchical manner as special playback speed increases; and means for creating common data when forming said plurality of special playback signals by hierarchically reducing temporal resolution with hierarchical frame thinning, wherein recording areas required for realizing multiple special playback speeds are reduced to a minimum.

3. The digital recording and reproducing apparatus according to claim 1, further including:

hierarchical coding means for forming said low-resolution signal, which is reproducible at normal playback speed, with an image compressing technique which lessens requisite bits by using discrete cosine transform coding, DCT, and variable length coding, for allotting, from said image-compressed low-resolution signal, the greatest number of bits of said plurality of special playback signals to a signal having the lowest speed in said special playback mode, for performing DCT of said image-compressed low-resolution signal used for said lowest speed, for subsequently arranging variable length coded DCT coefficients in order from the DC component of said DCT coefficients to the first to N-th AC components and end-of-data, EOD, representing an end of the DCT coefficients, thereby progressively reducing the allocation of bits required for said plurality of special playback signals as speed increases for special playback, for creating a common signal part to be shared with said plurality of special playback signals used for said plurality of special playback speeds, and for shifting said EOD to said end of said DCT coefficients to lessen the allocation of bits required for each special playback signal as special playback speed increases.

4. The digital recording and reproducing apparatus according to claim 1, further including:

means for allotting lower DCT coefficients to the areas within said plurality of special playback speed modes to hierarchize spatial resolution for said plurality of special playback speeds, and for allotting higher DCT coefficients as special playback speed decreases, thereby efficiently reducing recording areas for special playback.

5. The digital recording and reproducing apparatus according to claim 1, further including:

means for hierachizing temporal resolution wherein, when said compressed low-resolution signal is converted into a band-compressed digital SDTV signal by a standardized MPEG-2 image compression signal processing technique, said low-resolution signal is shaped as a special playback signal for said lowest speed mode so as to eliminate unnaturalness from a recorded and reproduced picture of said special playback signal, and so that said low-resolution signal is reproduced with said high-resolution signal in the normal playback mode, and wherein as special playback speed is increased, I-frames of an intraframe coded low-resolution MPEG-2 signal, P-frames for forward prediction and B-frames for bi-directional prediction of interframe codes processed between frames are used to thin at least part of said P- and B-frames by hierarchizing special resolution and prediction coding.

6. The digital recording and reproducing apparatus according to claim 5, further including:

means for recording I-frames of intraframe coding and P-frames of forward prediction into the recording areas for special playback while thinning B-frames for bi-directional prediction to hierarchize temporal resolution for said plurality of special playback speeds, thereby efficiently reducing recording areas for special playback.

7. The digital recording and reproducing apparatus according to claim 5, further including:

means for allotting lower DCT coefficients to the areas within said plurality of special playback speed modes to hierarchize spatial resolution for said plurality of special playback speeds, and for allotting higher DCT coefficients as special playback speed decreases, thereby efficiently reducing recording areas for special playback; and means for recording I-frames of intraframe coding and P-frames of forward prediction into the recording areas for special playback while thinning B-frames for bi-directional prediction to hierarchize temporal resolution for said plurality of special playback speeds, thereby efficiently reducing recording areas for special playback.

8. The digital recording and reproducing apparatus according to claim 1, wherein said high resolution signal carries data representing a large number of effective pixels and effective scanning lines.

9. The digital recording and reproducing apparatus according to claim 1, wherein said low resolution signal is formed by converting at least part of an encoding scheme for a number of effective pixels, a number of effective scanning lines, a number of frames and the aspect ratio of said high resolution signal.

* * * * *

UNITED STATES PATENT AND TRADEMARK OFFICE
CERTIFICATE OF CORRECTION

PATENT NO. : 6,097,877

DATED : August 1, 2000

INVENTOR(S): Katayama et al.

It is certified that error appears in the above-identified patent and that said Letters Patent are hereby corrected as shown below:

On the title page, the following Notice should appear:

[*] Notice: This patent issued on a continued prosecution application filed under 37 CFR 1.53(d), and is subject to the twenty year patent term provisions of 35 U.S.C. 154(a)(2).

Signed and Sealed this

Twenty-second Day of May, 2001

*Attest:*

NICHOLAS P. GODICI

*Attesting Officer*     Acting Director of the United States Patent and Trademark Office